US011323904B2

United States Patent
Li et al.

(10) Patent No.: US 11,323,904 B2
(45) Date of Patent: May 3, 2022

(54) MEASUREMENT AND REPORTING METHOD, TERMINAL, AND BASE STATION

(71) Applicant: HUAWEI TECHNOLOGIES CO., LTD., Guangdong (CN)

(72) Inventors: Hua Li, Shanghai (CN); Yi Ren, Shenzhen (CN); Zhongfeng Li, Munich (DE); Yi Qin, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/370,026

(22) Filed: Mar. 29, 2019

(65) Prior Publication Data
US 2019/0230547 A1 Jul. 25, 2019

Related U.S. Application Data

(63) Continuation of application No. PCT/CN2017/104092, filed on Sep. 28, 2017.

(30) Foreign Application Priority Data

Sep. 30, 2016 (CN) .......................... 201610875328.7
Jan. 6, 2017 (CN) .......................... 201710010676.2

(51) Int. Cl.
*H04W 24/10* (2009.01)
*H04B 7/06* (2006.01)
(Continued)

(52) U.S. Cl.
CPC .......... *H04W 24/10* (2013.01); *H04B 7/0626* (2013.01); *H04B 17/354* (2015.01);
(Continued)

(58) Field of Classification Search
CPC .. H04B 7/0626; H04B 17/354; H04B 17/364; H04B 17/391; H04W 24/10; H04W 72/121; H04W 72/1289; H04L 47/2483
See application file for complete search history.

(56) References Cited

U.S. PATENT DOCUMENTS

2013/0064131 A1* 3/2013 Kwon .................. H04L 5/0007
370/252
2013/0172002 A1 7/2013 Yu et al.
(Continued)

FOREIGN PATENT DOCUMENTS

CN 103202052 A 7/2013
CN 104025469 A 9/2014
(Continued)

OTHER PUBLICATIONS

International Search Report dated Dec. 12, 2017 in corresponding International Application No. PCT/CN2017/104092.
(Continued)

*Primary Examiner* — Jaime M Holliday
(74) *Attorney, Agent, or Firm* — Leydig, Voit & Mayer, Ltd.

(57) ABSTRACT

A measurement and reporting method is provided. The method includes: receiving, by a terminal, a measurement configuration from a base station, the measurement configuration indicates a plurality of measurement objects to be measured; obtaining measurement results and channel characteristic values respectively corresponding to the plurality of measurement objects; and sending channel characteristic values and measurement results respectively corresponding to some or all of the plurality of measurement objects, or group identification information and measurement results respectively corresponding to some or all of the plurality of measurement objects, where different groups correspond to different channel characteristic values. The base station
(Continued)

determines, from a plurality of measurement object groups, a plurality of target measurement objects used to send data to the terminal. Different groups correspond to different channel characteristic values. Therefore the plurality of target measurement objects from the plurality of measurement object groups are not easily shielded at the same time.

15 Claims, 4 Drawing Sheets

(51) Int. Cl.
    *H04B 17/354*    (2015.01)
    *H04B 17/364*    (2015.01)
    *H04B 17/391*    (2015.01)
    *H04L 47/2483*    (2022.01)
    *H04W 72/12*    (2009.01)

(52) U.S. Cl.
    CPC ......... *H04B 17/364* (2015.01); *H04B 17/391* (2015.01); *H04L 47/2483* (2013.01); *H04W 72/121* (2013.01); *H04W 72/1289* (2013.01)

(56) References Cited

U.S. PATENT DOCUMENTS

| | | | |
|---|---|---|---|
| 2013/0235742 | A1 | 9/2013 | Josiam et al. |
| 2014/0314167 | A1 | 10/2014 | Jeong et al. |
| 2016/0212645 | A1* | 7/2016 | Uemura ................ H04W 24/08 |
| 2016/0241322 | A1* | 8/2016 | Son ...................... H04W 72/046 |
| 2016/0302188 | A1* | 10/2016 | Lu ......................... H04L 5/0092 |
| 2017/0230857 | A1* | 8/2017 | Jung .................... H04B 17/318 |

FOREIGN PATENT DOCUMENTS

| | | |
|---|---|---|
| CN | 104937972 A | 9/2015 |
| CN | 105324944 A | 2/2016 |
| EP | 2999133 A1 | 3/2016 |

OTHER PUBLICATIONS

Jacob et al., "A Dynamic 60 GHz Radio Channel Model for System Level Simulations with MAC Protocols for IEEE 802.11ad," IEEE International Symposium on Consumer Electronics (ISCE 2010), pp. 1-5, Institute of Electrical and Electronics Engineers—New York, New York (Jul. 26, 2010).

Aalto University et al., "5G Channel Model for bands up to100 GHz," pp. 1-56 (Dec. 6, 2015).

"Motivations and Considerations on Massive MIMO for New Rat," 3GPP TSG RAN WG1 Meeting #85, Nanjing, China, R1164038, pp. 1-6, 3rd Generation Partnership Project—Valbonne, France (May 23-27, 2016).

"DL MIMO framework for NR," 3GPP TSG RAN WG1 #85, Nanjing, China, R1-164015, pp. 1-6, 3rd Generation Partnership Project—Valbonne, France (May 23-27, 2016).

"UL MIMO framework for NR," 3GPP TSG RAN WG1 #85, Nanjing, China, R1-164016, pp. 1-4, 3rd Generation Partnership Project—Valbonne, France (May 23-27, 2016).

"Multi-Antenna Technology for NR Interface," 3GPP TSG RAN WG1 Meeting #85, Nanjing, China, R1-165179, pp. 1-5, 3rd Generation Partnership Project—Valbonne, France (May 23-27, 2016).

"Discussion on Multi-Antenna Transmission of Synchronization and Reference Signals," 3GPP TSG RAN WG1 Meeting #85 Nanjing, China, R1-165180, pp. 1-5, 3rd Generation Partnership Project—Valbonne, France (May 23-27, 2016).

"On the UE beamforming in new radio," 3GPP TSG-RAN WG1#85, Nanjing, P. R. China, R1-165365, pp. 1-6, 3rd Generation Partnership Project—Valbonne, France (May 23-27, 2016).

"Uplink MIMO in new radio interface," 3GPP TSG-RAN WG1 #85, Nanjing, China, R1-164191, pp. 1-5, 3rd Generation Partnership Project—Valbonne, France (May 23-27, 2016).

"Beam selection and CSI acquisition for NR MIMO," 3GPP TSG RAN WG1 Meeting #86, Gothenburg, Sweden, R1-166212, pp. 1-6, 3rd Generation Partnership Project—Valbonne, France ( Aug. 22-26, 2016).

\* cited by examiner

MEASUREMENT AND REPORTING METHOD, TERMINAL, AND BASE STATION

CROSS-REFERENCE TO RELATED APPLICATIONS

This application is a continuation of International Application No. PCT/CN2017/104092, filed on Sep. 28, 2017, which claims priority to Chinese Patent Application No. 201710010676.2, filed on Jan. 6, 2017, which claims priority to Chinese Patent Application No. 201610875328.7, filed on Sep. 30, 2016, all of which are hereby incorporated by reference in their entireties.

TECHNICAL FIELD

Embodiments of this application relate to communications technologies, and in particular, to a measurement and reporting method, a terminal, and a base station.

BACKGROUND

During evolution of the fifth-generation mobile communications (5G) technology, communication at a large data rate needs to be supported, and a high-band spectrum resource has relatively large bandwidth and is an effective manner for implementing communication at a large data rate. However, due to a high-band radio propagation characteristic (a relatively large path loss), coverage in a high band is restricted. It is critical to maintaining desirable coverage while a large data rate is supported.

In consideration of a relatively short wavelength corresponding to a high band, an antenna distance can be reduced, so that more antenna array elements can be disposed in a same area. A large quantity of antenna array elements may constitute a large-scale array antenna, and the large-scale array antenna can achieve an array gain through beamforming, to effectively increase coverage and avoid a high-band path loss. Therefore, communication between a base station and a terminal in a high band is usually performed by using a beam. As shown in FIG. 1A (FIG. 1A is a first schematic diagram of communication by using a beam), a terminal reports a plurality of beams of a base station and channel quality measurement results corresponding to the plurality of beams; and further the base station determines one or more beams (used to send downlink data to the terminal) from the plurality of beams reported by the terminal. The terminal usually reports a plurality of beams corresponding to best reference signal received powers (RSRP). In the prior art, the terminal does not consider space continuity of shields during reporting; in addition, because a wavelength of a high-band spectrum is relatively short, a wireless signal has a relatively poor diffraction capability and is prone to impact of a shield. As a result, in the prior art, the one or more beams determined by the base station from the plurality of beams reported by the terminal may be at risk of being shielded, and communication reliability is relatively low.

SUMMARY

Embodiments of this application provide a measurement and reporting method, a terminal, and a base station, to improve communication reliability.

According to a first aspect, this application provides a measurement and reporting method, including:

receiving, by a terminal, a measurement configuration from a base station, where the measurement configuration is used to indicate a plurality of measurement objects to be measured;

obtaining, by the terminal, measurement results and channel characteristic values respectively corresponding to the plurality of measurement objects; and sending, by the terminal, channel characteristic values and measurement results respectively corresponding to some or all of the plurality of measurement objects, or group identification information and measurement results respectively corresponding to some or all of the plurality of measurement objects, where different groups are corresponding to different channel characteristic values, and channel characteristic values in a same group may be the same or may be different.

In a possible design, a channel characteristic includes one or more of the following:

an angle of arrival, an average angle of arrival, angle-of-arrival spread, an angle of departure, an average angle of departure, angle-of-departure spread, QCL information, a transmission delay, an average transmission delay, transmission delay spread, channel quality, and a terminal receiving object.

In a possible design, the method further includes:

receiving, by the terminal, reporting mode instruction information from the base station, where the reporting mode instruction information is used to:

instruct the terminal to report the channel characteristic values and the measurement results respectively corresponding to the some or all of the plurality of measurement objects; or instruct the terminal to report the group identification information and the measurement results respectively corresponding to the some or all of the plurality of measurement objects, where the some or all of the plurality of measurement objects belong to a same group; or instruct the terminal to report the group identification information and the measurement results respectively corresponding to the some or all of the plurality of measurement objects, where the some or all of the plurality of measurement objects belong to different groups.

In a possible design, the channel characteristic is an angle of arrival, and that different groups are corresponding to different channel characteristic values includes: different groups are corresponding to different angle-of-arrival values.

In a possible design, the channel characteristic is an average angle of arrival and angle-of-arrival spread, and that different groups are corresponding to different channel characteristic values includes: different groups are corresponding to different average angle-of-arrival values and different angle-of-arrival spread values.

In a possible design, the channel characteristic is an angle of departure, and that different groups are corresponding to different channel characteristic values includes: different groups are corresponding to different angle-of-departure values.

In a possible design, the channel characteristic is an average angle of departure and angle-of-departure spread, and that different groups are corresponding to different channel characteristic values includes: different groups are corresponding to different average angle-of-departure values and different angle-of-departure spread values.

In a possible design, the channel characteristic is QCL information, and that different groups are corresponding to different channel characteristic values includes: different groups are corresponding to different QCL information.

In a possible design, the channel characteristic is a transmission delay, and that different groups are corresponding to different channel characteristic values includes: different groups are corresponding to different transmission delay values.

In a possible design, the channel characteristic is an average transmission delay and transmission delay spread, and that different groups are corresponding to different channel characteristic values includes: different groups are corresponding to different average transmission delay values and different transmission delay spread values.

In a possible design, the channel characteristic is channel quality, and that different groups are corresponding to different channel characteristic values includes: different groups are corresponding to different channel quality values.

In a possible design, the channel characteristic is a terminal receiving object, and that different groups are corresponding to different channel characteristic values includes: different groups are corresponding to different terminal receiving object values.

In a possible design, the measurement results corresponding to the some of the measurement objects satisfy a preset condition.

In a possible design, after the sending, by the terminal, group identification information and measurement results respectively corresponding to some or all of the plurality of measurement objects, the method further includes:

receiving, by the terminal, data that is sent by the base station by using target measurement objects, where the target measurement objects are selected from different groups.

In a possible design, after the sending, by the terminal, group identification information and measurement results respectively corresponding to some or all of the plurality of measurement objects, the method further includes:

receiving, by the terminal, data that is sent by the base station by using target measurement objects, where the target measurement objects are selected from one group.

In a possible design, the method further includes:

using, by the terminal as a sending measurement object, a receiving object that is utilized when the data sent by the base station by using the target measurement objects is being received, where the sending measurement object is used by the terminal to send data to the base station.

According to the measurement and reporting method provided in the first aspect, after receiving the measurement configuration (which is used to indicate the plurality of measurement objects to be measured) sent by the base station, the terminal obtains the measurement results and the channel characteristic values respectively corresponding to the plurality of measurement objects, and sends the group identification information and the measurement results respectively corresponding to the some or all of the plurality of measurement objects, where different groups are corresponding to different channel characteristic values, so that the base station receives the group identification information and the measurement results that are respectively corresponding to the some or all of the plurality of measurement objects and that are reported by the terminal, and determines, from a plurality of measurement object groups after determining a grouping status of measurement objects, a plurality of target measurement objects used to send data to the terminal. Alternatively, the terminal obtains the measurement results and the channel characteristic values respectively corresponding to the plurality of measurement objects, and sends the channel characteristic values and the measurement results respectively corresponding to the some or all of the plurality of measurement objects, so that the base station groups the some or all of the plurality of measurement objects based on the channel characteristic values respectively corresponding to the some or all of the plurality of measurement objects, and determines, from a plurality of measurement object groups, a plurality of target measurement objects used to send data to the terminal. To sum up, different groups are corresponding to different channel characteristic values in this application (to be specific, a difference between transmission paths corresponding to measurement objects in different groups is greater than a preset difference), and therefore the plurality of target measurement objects determined by the base station from the plurality of measurement object groups are not easily shielded at the same time. This improves communication reliability.

According to a second aspect, this application provides a measurement and reporting method, including:

sending, by a base station, a measurement configuration to a terminal, where the measurement configuration is used to indicate a plurality of measurement objects to be measured; and receiving, by the base station from the terminal, group identification information and measurement results respectively corresponding to some or all of the plurality of measurement objects, or channel characteristic values and measurement results respectively corresponding to some or all of the plurality of measurement objects, where different groups are corresponding to different channel characteristic values.

In a possible design, a channel characteristic includes one or more of the following:

an angle of arrival, an average angle of arrival, angle-of-arrival spread, an angle of departure, an average angle of departure, angle-of-departure spread, QCL information, a transmission delay, an average transmission delay, transmission delay spread, channel quality, and a terminal receiving object.

In a possible design, the method further includes:

sending, by the base station, reporting mode instruction information to the terminal, where the reporting mode instruction information is used to:

instruct the terminal to report the channel characteristic values and the measurement results respectively corresponding to the some or all of the plurality of measurement objects; or instruct the terminal to report the group identification information and the measurement results respectively corresponding to the some or all of the plurality of measurement objects, where the some or all of the plurality of measurement objects belong to a same group; or instruct the terminal to report the group identification information and the measurement results respectively corresponding to the some or all of the plurality of measurement objects, where the some or all of the plurality of measurement objects belong to different groups.

In a possible design, the method further includes:

grouping, by the base station, the some or all of the plurality of measurement objects based on the channel characteristic values respectively corresponding to the some or all of the plurality of measurement objects.

In a possible design, the channel characteristic is an angle of arrival, and that different groups are corresponding to different channel characteristic values includes: different groups are corresponding to different angle-of-arrival values.

In a possible design, the channel characteristic is an average angle of arrival and angle-of-arrival spread, and that different groups are corresponding to different channel characteristic values includes: different groups are corresponding to different average angle-of-arrival values and different angle-of-arrival spread values.

In a possible design, the channel characteristic is an angle of departure, and that different groups are corresponding to different channel characteristic values includes: different groups are corresponding to different angle-of-departure values.

In a possible design, the channel characteristic is an average angle of departure and angle-of-departure spread, and that different groups are corresponding to different channel characteristic values includes: different groups are corresponding to different average angle-of-departure values and different angle-of-departure spread values.

In a possible design, the channel characteristic is QCL information, and that different groups are corresponding to different channel characteristic values includes: different groups are corresponding to different QCL information.

In a possible design, the channel characteristic is a transmission delay, and that different groups are corresponding to different channel characteristic values includes: different groups are corresponding to different transmission delay values.

In a possible design, the channel characteristic is an average transmission delay and transmission delay spread, and that different groups are corresponding to different channel characteristic values includes: different groups are corresponding to different average transmission delay values and different transmission delay spread values.

In a possible design, the channel characteristic is channel quality, and that different groups are corresponding to different channel characteristic values includes: different groups are corresponding to different channel quality values.

In a possible design, the channel characteristic is a terminal receiving object, and that different groups are corresponding to different channel characteristic values includes: different groups are corresponding to different terminal receiving object values.

In a possible design, the method further includes:
selecting, by the base station, a plurality of target measurement objects from different groups; and
sending, by the base station, data to the terminal by using the plurality of target measurement objects.

In a possible design, the method further includes:
selecting, by the base station, a plurality of target measurement objects from one group; and
sending, by the base station, data to the terminal by using the plurality of target measurement objects.

In a possible design, measurement results corresponding to the target measurement objects satisfy a preset condition.

In a possible design, the method further includes:
determining, by the base station, target measurement objects of another base station based on the group identification information and the measurement results respectively corresponding to the some or all of the plurality of measurement objects; and
sending, by the base station, resource indication information to the another base station, where the resource indication information includes identifiers of the target measurement objects of the another base station.

According to the measurement and reporting method provided in the second aspect, the base station receives the group identification information and the measurement results that are respectively corresponding to the some or all of the plurality of measurement objects and that are reported by the terminal, so that the base station determines, from a plurality of measurement object groups after determining a grouping status of measurement objects, a plurality of target measurement objects used to send data to the terminal. Alternatively, the base station receives the channel characteristic values and the measurement results that are respectively corresponding to the some or all of the plurality of measurement objects and that are sent by the terminal, so that the base station groups the some or all of the plurality of measurement objects based on the channel characteristic values respectively corresponding to the some or all of the plurality of measurement objects, and determines, from a plurality of measurement object groups, a plurality of target measurement objects used to send data to the terminal. To sum up, different groups are corresponding to different channel characteristic values in this embodiment of this application (to be specific, a difference between transmission paths corresponding to measurement objects in different groups is greater than a preset difference), and therefore the plurality of target measurement objects determined by the base station from the plurality of measurement object groups are not easily shielded at the same time. This improves communication reliability.

According to a third aspect, this application provides a terminal, including a receiver, a transmitter, and a processor, where
the receiver is configured to receive a measurement configuration from a base station, where the measurement configuration is used to indicate a plurality of measurement objects to be measured;
the processor is configured to obtain measurement results and channel characteristic values respectively corresponding to the plurality of measurement objects; and
the transmitter is configured to send channel characteristic values and measurement results respectively corresponding to some or all of the plurality of measurement objects, or group identification information and measurement results respectively corresponding to some or all of the plurality of measurement objects, where different groups are corresponding to different channel characteristic values.

In a possible design, a channel characteristic includes one or more of the following:
an angle of arrival, an average angle of arrival, angle-of-arrival spread, an angle of departure, an average angle of departure, angle-of-departure spread, QCL information, a transmission delay, an average transmission delay, transmission delay spread, channel quality, and a terminal receiving object.

In a possible design, the receiver is further configured to receive reporting mode instruction information from the base station, where the reporting mode instruction information is used to:
instruct the terminal to report the channel characteristic values and the measurement results respectively corresponding to the some or all of the plurality of measurement objects; or
instruct the terminal to report the group identification information and the measurement results respectively corresponding to the some or all of the plurality of measurement objects, where the some or all of the plurality of measurement objects belong to a same group; or
instruct the terminal to report the group identification information and the measurement results respectively corresponding to the some or all of the plurality of measurement objects, where the some or all of the plurality of measurement objects belong to different groups.

In a possible design, the channel characteristic is an angle of arrival, and that different groups are corresponding to different channel characteristic values includes: different groups are corresponding to different angle-of-arrival values.

In a possible design, the channel characteristic is an average angle of arrival and angle-of-arrival spread, and that different groups are corresponding to different channel characteristic values includes: different groups are corresponding to different average angle-of-arrival values and different angle-of-arrival spread values.

In a possible design, the channel characteristic is an angle of departure, and that different groups are corresponding to different channel characteristic values includes: different groups are corresponding to different angle-of-departure values.

In a possible design, the channel characteristic is an average angle of departure and angle-of-departure spread, and that different groups are corresponding to different channel characteristic values includes: different groups are corresponding to different average angle-of-departure values and different angle-of-departure spread values.

In a possible design, the channel characteristic is QCL information, and that different groups are corresponding to different channel characteristic values includes: different groups are corresponding to different QCL information.

In a possible design, the channel characteristic is a transmission delay, and that different groups are corresponding to different channel characteristic values includes: different groups are corresponding to different transmission delay values.

In a possible design, the channel characteristic is an average transmission delay and transmission delay spread, and that different groups are corresponding to different channel characteristic values includes: different groups are corresponding to different average transmission delay values and different transmission delay spread values.

In a possible design, the channel characteristic is channel quality, and that different groups are corresponding to different channel characteristic values includes: different groups are corresponding to different channel quality values.

In a possible design, the channel characteristic is a terminal receiving object, and that different groups are corresponding to different channel characteristic values includes: different groups are corresponding to different terminal receiving object values.

In a possible design, the measurement results corresponding to the some of the measurement objects satisfy a preset condition.

In a possible design, the receiver is further configured to receive data that is sent by the base station by using target measurement objects, where the target measurement objects are selected from different groups.

In a possible design, the receiver is further configured to receive data that is sent by the base station by using target measurement objects, where the target measurement objects are selected from one group.

In a possible design, the processor is further configured to use, as a sending measurement object, a receiving object that is utilized when the data sent by the base station by using the target measurement objects is being received, where the sending measurement object is used by the terminal to send data to the base station.

For beneficial effects of the terminal provided in the third aspect and the possible implementations of the third aspect, reference may be made to the beneficial effects brought by the first aspect and the possible implementations of the first aspect. Details are not described herein again.

According to a fourth aspect, this application provides a base station, including a transmitter and a receiver, where the transmitter is configured to send a measurement configuration to a terminal, where the measurement configuration is used to indicate a plurality of measurement objects to be measured; and the receiver is configured to receive, from the terminal, group identification information and measurement results respectively corresponding to some or all of the plurality of measurement objects, or channel characteristic values and measurement results respectively corresponding to some or all of the plurality of measurement objects, where different groups are corresponding to different channel characteristic values.

In a possible design, a channel characteristic includes one or more of the following:

an angle of arrival, an average angle of arrival, angle-of-arrival spread, an angle of departure, an average angle of departure, angle-of-departure spread, QCL information, a transmission delay, an average transmission delay, transmission delay spread, channel quality, and a terminal receiving object.

In a possible design, the transmitter is further configured to send reporting mode instruction information to the terminal, where the reporting mode instruction information is used to:

instruct the terminal to report the channel characteristic values and the measurement results respectively corresponding to the some or all of the plurality of measurement objects; or instruct the terminal to report the group identification information and the measurement results respectively corresponding to the some or all of the plurality of measurement objects, where the some or all of the plurality of measurement objects belong to a same group; or instruct the terminal to report the group identification information and the measurement results respectively corresponding to the some or all of the plurality of measurement objects, where the some or all of the plurality of measurement objects belong to different groups.

In a possible design, the base station further includes a first processor, where the first processor is configured to group the some or all of the plurality of measurement objects based on the channel characteristic values respectively corresponding to the some or all of the plurality of measurement objects.

In a possible design, the channel characteristic is an angle of arrival, and that different groups are corresponding to different channel characteristic values includes: different groups are corresponding to different angle-of-arrival values.

In a possible design, the channel characteristic is an average angle of arrival and angle-of-arrival spread, and that different groups are corresponding to different channel characteristic values includes: different groups are corresponding to different average angle-of-arrival values and different angle-of-arrival spread values.

In a possible design, the channel characteristic is an angle of departure, and that different groups are corresponding to different channel characteristic values includes: different groups are corresponding to different angle-of-departure values.

In a possible design, the channel characteristic is an average angle of departure and angle-of-departure spread, and that different groups are corresponding to different channel characteristic values includes: different groups are corresponding to different average angle-of-departure values and different angle-of-departure spread values.

In a possible design, the channel characteristic is QCL information, and that different groups are corresponding to different channel characteristic values includes: different groups are corresponding to different QCL information.

In a possible design, the channel characteristic is a transmission delay, and that different groups are corresponding to different channel characteristic values includes: different groups are corresponding to different transmission delay values.

In a possible design, the channel characteristic is an average transmission delay and transmission delay spread, and that different groups are corresponding to different channel characteristic values includes: different groups are corresponding to different average transmission delay values and different transmission delay spread values.

In a possible design, the channel characteristic is channel quality, and that different groups are corresponding to different channel characteristic values includes: different groups are corresponding to different channel quality values.

In a possible design, the channel characteristic is a terminal receiving object, and that different groups are corresponding to different channel characteristic values includes: different groups are corresponding to different terminal receiving object values.

In a possible design, the transmitter is further configured to:

select a plurality of target measurement objects from different groups; and send data to the terminal by using the plurality of target measurement objects.

In a possible design, the transmitter is further configured to:

select a plurality of target measurement objects from one group; and send data to the terminal by using the plurality of target measurement objects.

In a possible design, measurement results corresponding to the target measurement objects satisfy a preset condition.

In a possible design, the base station further includes a second processor, where the second processor is configured to determine target measurement objects of another base station based on the group identification information and the measurement results respectively corresponding to the some or all of the plurality of measurement objects; and the transmitter is further configured to send resource indication information to the another base station, where the resource indication information includes identifiers of the target measurement objects of the another base station.

For beneficial effects of the base station provided in the fourth aspect and the possible implementations of the fourth aspect, reference may be made to the beneficial effects brought by the second aspect and the possible implementations of the second aspect. Details are not described herein again.

In the foregoing aspects, the terminal sends a message to the base station, where the message carries a measurement object identifier used by the terminal to send the message;

the base station receives the message sent by the terminal, where the message carries the measurement object identifier used by the terminal to send the message; and the base station determines a spatial distribution relationship between measurement objects for the terminal side based on the measurement object identifier and preset measurement object arrangement information.

BRIEF DESCRIPTION OF DRAWINGS

To describe the technical solutions in the embodiments of this application or in the prior art more clearly, the following briefly describes the accompanying drawings required for describing the embodiments or the prior art. Apparently, the accompanying drawings in the following description show some embodiments of this application, and persons of ordinary skill in the art may derive other drawings from these accompanying drawings without creative efforts.

DESCRIPTION OF EMBODIMENTS

Figure 1A:
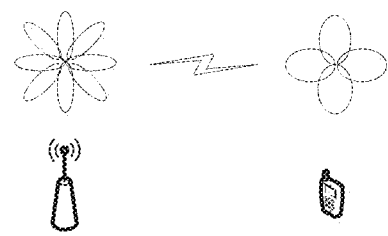
FIG. 1A is a first schematic diagram of communication by using a beam.

To make the objectives, technical solutions, and advantages of the embodiments of this application clearer, the following clearly describes the technical solutions in the embodiments of this application with reference to the accompanying drawings in the embodiments of this application. Apparently, the described embodiments are merely some but not all of the embodiments of this application. All other embodiments obtained by persons of ordinary skill in the art based on the embodiments of this application without creative efforts shall fall within the protection scope of this application.

A terminal in the embodiments of this application may be a handheld device having a wireless connection function or another processing device connected to a wireless modem. For example, the terminal may be specifically a mobile terminal, such as a mobile phone (also referred to as a "cellular" phone) or a computer having a mobile terminal. The computer having a mobile terminal may be a portable, pocket-sized, handheld, computer built-in, or in-vehicle mobile apparatus, and such mobile apparatuses can exchange voice and/or data with a core network. For example, the terminal may be a personal communications service (PCS) phone, a cordless telephone set, a Session Initiation Protocol (SIP) phone, a wireless local loop (WLL) station, a personal digital assistant (PDA), or another device. Optionally, the terminal may also be referred to as a system, a subscriber unit, a subscriber station, a mobile station, a mobile console, a remote station, an access point, a remote terminal, an access terminal, a user terminal, a user agent, a user device, or user equipment.

A base station in the embodiments of this application may be a device that communicates with a wireless terminal over an air interface in an access network by using one or more sectors. The base station may be configured to perform conversion between a received over-the-air frame and an IP packet and serve as a router between the wireless terminal and another portion of the access network, where the another portion of the access network may include an Internet Protocol (IP) network. The base station may further coordinate attribute management of the air interface. For example, the base station may be a base transceiver station (BTS) in GSM and CDMA, a NodeB in WCDMA, an evolved NodeB (NodeB, eNB, or e-NodeB) in LTE, or a transmission reception point (TRP) or a gNB. This is not limited in the embodiments of this application.

A measurement object in the embodiments of this application is an object associated with data transmission, and two wireless devices can perform wireless communication by using the measurement object. For example, the measurement object may include one or more of the following: a beam, a port, and a space resource. Certainly, the measurement object may further include other content, and this is not limited in the embodiments of this application. Optionally, meanings of the measurement object may vary with development of technologies, and this is not limited in this application.

A channel characteristic corresponding to the measurement object in this application is a characteristic associated with a transmission path or channel quality. Optionally, different channel characteristic values indicate different transmission paths or different channel quality, and a channel characteristic value is used by a base station or a terminal to group measurement objects. Optionally, measurement objects may be grouped based on channel characteristic values. Measurement objects in different groups are corresponding to different channel characteristic values, and channel characteristic values corresponding to measurement objects in a same group may be the same or may be different.

When measurement objects in a same group are corresponding to a same channel characteristic value or approximate channel characteristic values, measurement objects having a same transmission path characteristic can be classified into one group through grouping (different groups reflect different transmission path characteristics). In addition, when channel characteristic values corresponding to a plurality of measurement objects are different, if all the channel characteristic values corresponding to the plurality of measurement objects satisfy a same condition, for example, fall within a same interval, it may also be considered that the channel characteristic values corresponding to the plurality of measurement objects are the same.

When measurement objects in a same group are corresponding to different channel characteristic values, measurement objects having different transmission path characteristics can be classified into one group through grouping. For example, a difference between the channel characteristic values corresponding to the plurality of measurement objects exceeds a specific interval, and in this case, a base station can implement transmit diversity only by using beams in one group. UE may report a plurality of groups of measurement object identifiers for selection by the base station, or when reported resources of each group are limited, the UE needs to allocate a reporting result to a different group. Alternatively, a channel characteristic value corresponding to a measurement object in a group is different from a channel characteristic value corresponding to a certain measurement object, and channel characteristic values corresponding to measurement objects in the group are allowed to be the same. In this case, the UE may report a plurality of groups of measurement object identifiers for measurement by the base station.

A measurement result of the measurement object in this application is used to indicate channel state information corresponding to the measurement object. Optionally, the measurement result includes one or more of the following: a reference signal received power (RSRP), a signal-to-noise ratio (SNR), a beam ID, a resource ID, a channel quality indicator (CQI), and a precoding matrix indicator (PMI). Certainly, the measurement result may further include other information, and this is not limited in the embodiments of this application. In this application, the measurement result of the measurement object may be obtained by measuring the measurement object. A channel characteristic value corresponding to the measurement object may be obtained based on the measurement result, or a channel characteristic value corresponding to the measurement object may be obtained directly by measuring the measurement object.

Group identification information in this application is information used to identify measurement objects that belong to a same group. Optionally, the group identification information may be explicit group indication information, for example, a group index. Alternatively, the group identification information may be implicit indication information, for example, it may be considered that measurement objects without explicit group indication information belong to a same group.

A receiving object in this application is an object associated with data transmission, and a wireless device can receive transmitted data by using the receiving object. For example, the receiving object may include one or more of the following: a beam, a port, or a space resource. Optionally, meanings of the receiving object may vary with development of technologies, and this is not limited in this application.

A measurement and reporting method provided in the embodiments of this application may be applicable to a terminal and a base station in a high-frequency communications system. Optionally, the high-frequency communications system may be a 5G communications system, a Long Term Evolution (LTE) communications system, or the like. Certainly, the measurement and reporting method in the embodiments of this application includes but is not limited to the foregoing application scenarios, and may be further applied to other application scenarios. This is not limited the embodiments of this application.

Usually, in terms of costs, that each antenna array element in a large-scale antenna array is connected to a radio frequency channel cannot be implemented. When there are a limited quantity of radio frequency channels, analog-phase weighting can be performed at a radio frequency end by using a phase shifter at the radio frequency end, so that analog beams are formed at the radio frequency end (analog beams may be formed on a base station side or a terminal side). Different beam directions can be implemented by changing phase weights of antenna array elements. In addition, digital weighting can still be performed for a limited quantity of radio frequency channels. For a high band, a manner combining analog and digital weighting may be used in compliance with coverage requirements.

Figure 1B:
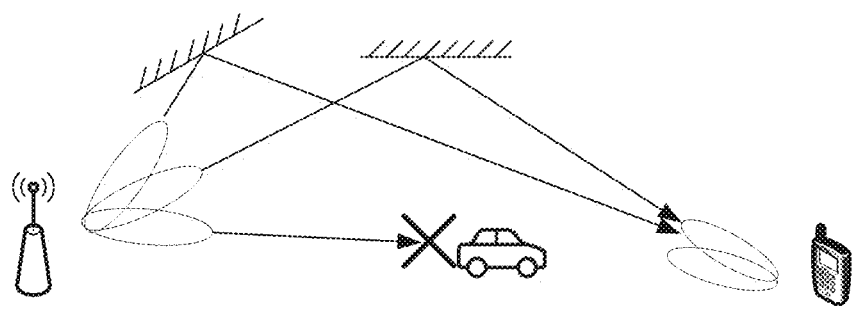
FIG. 1B is a second schematic diagram of communication by using a beam.

Because a wavelength of a high-band spectrum is relatively short, a wireless signal has a relatively poor diffraction capability and is prone to impact of a shield. For example, as shown in FIG. 1B (FIG. 1B is a second schematic diagram of communication by using a beam), if there is a shield such as a person or a car between a base station and a terminal, a path loss of a communication link increases by 10 dB to 30 dB, greatly affecting communication reliability.

To reduce impact of shielding on communication reliability, usually, a transmit diversity mode or a fast beam switching mode may be used. (1) In the transmit diversity mode, a connection of a plurality of beams is kept between a base station and a terminal, and after one or more beams are shielded, remaining beams that are not shielded can still be used for communication. (2) In the fast beam switching mode, after a current beam is shielded, a terminal finds that channel quality deteriorates and applies to a base station for beam switching, so that the base station switches from the beam to another beam that is not shielded, thereby establishing a new connection.

Regardless of the transmit diversity mode or the fast beam switching mode, a beam used by the base station is determined from a plurality of beams reported by the terminal. However, in the prior art, the terminal does not consider space continuity of shields during reporting. As a result, in the prior art, the one or more beams determined by the base station from the plurality of beams reported by the terminal may be at risk of being shielded, and communication reliability in the transmit diversity mode and the fast beam switching mode is greatly affected.

In comparison with the prior art, in the embodiments of this application, the terminal or the base station classifies a plurality of measurement objects into different measurement object groups, so that the base station determines, from a plurality of measurement object groups, a plurality of target measurement objects used to send data to the terminal. Different groups are corresponding to different channel characteristic values in the embodiments of this application (to be specific, a difference between transmission paths corresponding to measurement objects in different groups is greater than a preset difference), and therefore the plurality of target measurement objects determined by the base station from the plurality of measurement object groups are not easily shielded at the same time. This improves communication reliability.

Figure 2:
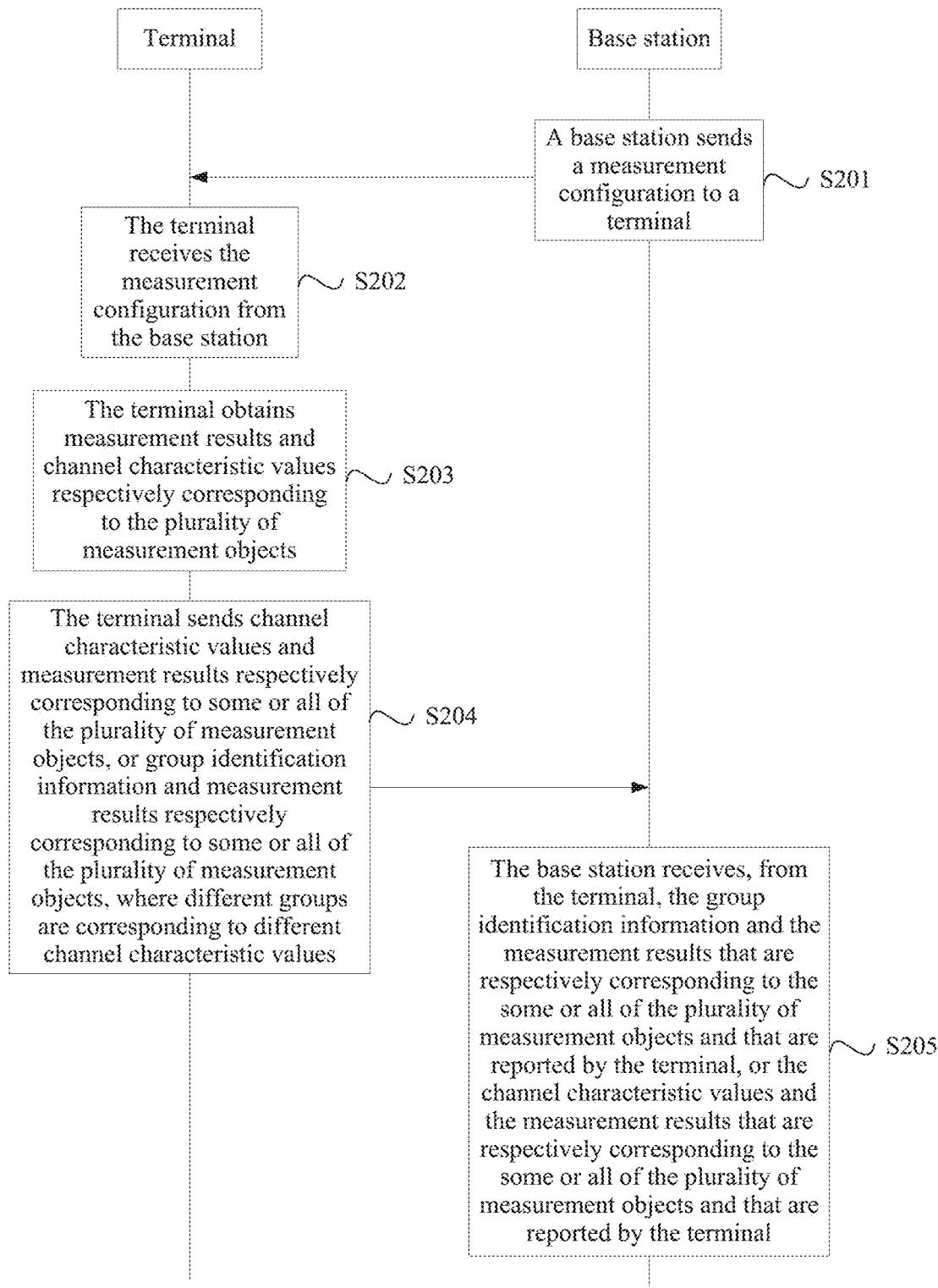
FIG. 2 is a schematic flowchart of a measurement and reporting method according to an embodiment of this application.

FIG. 2 is a schematic flowchart of a measurement and reporting method according to an embodiment of this application. As shown in FIG. 2, the method in this embodiment may include the following steps.

S201. A base station sends a measurement configuration to a terminal.

In this step, the base station sends the measurement configuration to the terminal, where the measurement configuration is used to indicate a plurality of measurement objects to be measured, so that the base station measures the plurality of measurement objects. Optionally, the measurement configuration may include a plurality of measurement parameters, for example, a period and a subframe number that are corresponding to a pilot signal, and the like. Optionally, the base station may send the measurement configuration by sending reference signals to the terminal by using the plurality of measurement objects to be measured, where each reference signal can identify a corresponding measurement object. Certainly, the base station may alternatively send the measurement configuration to the terminal in another manner. This is not limited in this embodiment of this application.

S202. The terminal receives the measurement configuration from the base station.

In this step, the terminal receives the measurement configuration that is used to indicate the plurality of measurement objects to be measured and that is sent by the base station.

S203. The terminal obtains measurement results and channel characteristic values respectively corresponding to the plurality of measurement objects.

In this step, the terminal performs channel measurement on the plurality of measurement objects based on the measurement configuration to obtain the measurement results and the channel characteristic values respectively corresponding to the plurality of measurement objects. Optionally, a channel characteristic includes one or more of the following: an angle of arrival, an average angle of arrival, angle-of-arrival spread, an angle of departure, an average angle of departure, angle-of-departure spread, QCL (Quasi-co-located) information, a transmission delay, an average transmission delay, transmission delay spread, channel quality, and a terminal receiving object. Certainly, the channel characteristic may further include other information, and this is not limited in this embodiment of this application. Optionally, the channel quality includes one or more of the following: a signal strength, a power, an RSRP, a CQI, and the like. Certainly, the channel quality may further include other information, and this is not limited in this embodiment of this application. (1) An angle of arrival is used to indicate an arrival direction of different transmission paths, and optionally the angle of arrival may be a horizontal angle of arrival or a vertical angle of arrival. (2) An average angle of arrival is used to indicate an average of angles of arrival of a plurality of different transmission paths, and angle-of-arrival spread is used to indicate a coverage area of angles of arrival of a plurality of different transmission paths. Optionally, the average angle of arrival may be a horizontal average angle of arrival, and correspondingly the angle-of-arrival spread is horizontal angle-of-arrival spread; or the average angle of arrival may be a vertical average angle of arrival, and correspondingly the angle-of-arrival spread is vertical angle-of-arrival spread. (3) An angle of departure is used to indicate a departure direction of different transmission paths, and optionally the angle of departure may be a horizontal angle of departure or a vertical angle of departure. (4) An average angle of departure is used to indicate an average of angles of departure of a plurality of different transmission paths, and angle-of-departure spread is used to indicate a coverage area of angles of departure of a plurality of different transmission paths. Optionally, the average angle of departure may be a horizontal average angle of departure, and correspondingly the angle-of-departure spread is horizontal angle-of-departure spread; or the average angle of departure may be a vertical average angle of departure, and correspondingly the angle-of-departure spread is vertical angle-of-departure spread. (5) QCL information is QCL-related information. Having a QCL relationship means that reference signals corresponding to antenna ports have a same parameter. Alternatively, having a QCL relationship means that a user may determine, based on a parameter of another antenna port, a parameter of an antenna port having a QCL relationship with the antenna port. Alternatively, having a QCL relationship means that two antenna ports have a same parameter. Alternatively, having a QCL relationship means that a difference between parameters of two antenna ports is less than a threshold. The parameter may be at least one of delay spread, Doppler spread, a Doppler frequency shift, an average delay, an average gain, an angle of arrival (Angle of arrival, AOA), an average AOA, AOA spread, an angle of departure (Angle of Departure, AOD), an average angle of departure AOD, AOD spread, a receive-antenna spatial correlation parameter, a transmit beam, a receive beam, and a resource identifier. The beam includes at least one of a precode, a weight sequence number, and a beam sequence number. The angles may be decomposition values in different dimensions or a combination of decomposition values in different dimensions. The antenna ports are antenna ports having different antenna port numbers; and/or antenna ports that have a same antenna port number and that are used to send or receive information on different time resources, and/or frequency resources, and/or code domain resources; and/or antenna ports that have different antenna port numbers and that are used to send or receive information on different time resources, and/or frequency resources, and/or code domain resources. The resource identifier includes a channel state information-reference signal (Channel State Information Reference Signal, CSI-RS) resource identifier or an SRS resource identifier, and is used to indicate a beam on a resource. (6) A transmission delay is used to indicate a delay of a transmission path from a transmit end to a receive end. (7) An average transmission delay is used to indicate an average delay of a plurality of transmission paths, and transmission delay spread is used to indicate a delay range of a plurality of transmission paths. (8) Channel quality is used to indicate a signal strength, a receive power, or a CQI of a transmit end. (9) A terminal receiving object is used to indicate different receive beams. For manners of determining an angle of arrival, an average angle of arrival, angle-of-arrival spread, a transmission delay, an average transmission delay, transmission delay spread, channel quality, and the like, reference may be made to existing corresponding determining manners. This is not limited in this embodiments of the this application.

S204. The terminal sends channel characteristic values and measurement results respectively corresponding to some or all of the plurality of measurement objects, or group identification information and measurement results respectively corresponding to some or all of the plurality of measurement objects, where different groups are corresponding to different channel characteristic values.

In this step, a specific process of the sending, by the terminal, group identification information and measurement results respectively corresponding to some or all of the plurality of measurement objects is implemented in the following manner.

Optionally, after obtaining the measurement results and the channel characteristic values respectively corresponding to the plurality of measurement objects, the terminal classifies the plurality of measurement objects into different measurement object groups based on different values of channel characteristics of a same type. Different groups are corresponding to different channel characteristic values (to be specific, a difference between transmission paths or signal strengths corresponding to measurement objects in different groups is greater than a preset difference); and channel characteristic values corresponding to measurement objects in a same group are the same (that is, transmission paths corresponding to measurement objects in a same group are the same or similar; to be specific, a difference between transmission paths or signal strengths corresponding to measurement objects in a same group is less than or equal to the preset difference), or channel characteristic values corresponding to all or some of measurement objects in a same group are different. Optionally, the channel characteristic value in this application may be an absolute value or an interval.

Optionally, the terminal classifies the plurality of measurement objects into different measurement object groups based on different values of channel characteristics of a same type in at least the following implementable manners.

First Implementable Manner:

When the channel characteristic is an angle of arrival, the terminal classifies the plurality of measurement objects into different measurement object groups based on different angle-of-arrival values. Optionally, there are the following cases. (A) If the channel characteristic value may be an absolute value, the terminal classifies measurement objects, in the plurality of measurement objects, corresponding to a same angle-of-arrival value into one group, where different groups are corresponding to different angle-of-arrival values, and measurement objects in a same group are corresponding to a same angle-of-arrival value. (B) If the channel characteristic value may be an interval, the terminal classifies measurement objects, in the plurality of measurement objects, corresponding to an angle-of-arrival value belonging to a first preset angle-of-arrival interval into a measurement object group 1; classifies measurement objects, in the plurality of measurement objects, corresponding to an angle-of-arrival value belonging to a second preset angle-of-arrival interval into a measurement object group 2; classifies measurement objects, in the plurality of measurement objects, corresponding to an angle-of-arrival value belonging to a third preset angle-of-arrival interval into a measurement object group 3; and so on. In this way, the plurality of measurement objects are classified into different measurement object groups. Different groups are corresponding to different angle-of-arrival values, and measurement objects in a same group are corresponding to a same angle-of-arrival value. (C) If the channel characteristic value may be an absolute value, the terminal classifies measurement objects, in the plurality of measurement objects, corresponding to different angle-of-arrival values into one group, where different groups are corresponding to different angle-of-arrival values, and measurement objects in a same group are corresponding to different angle-of-arrival values. (D) If the channel characteristic value may be an interval, the terminal classifies measurement objects, in the plurality of measurement objects, corresponding to angle-of-arrival values belonging to different angle-of-arrival intervals into a same measurement object group, where different groups are corresponding to different angle-of-arrival values, and measurement objects in a same group are corresponding to different angle-of-arrival values. Certainly, the terminal may alternatively classify the plurality of measurement objects into different measurement object groups based on different angle-of-arrival values in another manner. This is not limited in this embodiment of this application.

Second Implementable Manner:

When the channel characteristic includes an average angle of arrival and angle-of-arrival spread, the terminal classifies the plurality of measurement objects into different measurement object groups based on different average angle-of-arrival values and different angle-of-arrival spread values. Optionally, there are the following cases. (A) If the channel characteristic value may be an absolute value, the terminal classifies measurement objects, in the plurality of measurement objects, corresponding to a same average angle-of-arrival value and a same angle-of-arrival spread value into one group, where different groups are corresponding to different average angle-of-arrival values and different angle-of-arrival spread values, and measurement objects in a same group are corresponding to a same angle-of-arrival value and a same angle-of-arrival spread value. (B) If the channel characteristic value may be an interval, the terminal classifies measurement objects, in the plurality of measurement objects, corresponding to an average angle-of-arrival value belonging to a first preset average angle-of-arrival interval and an angle-of-arrival spread value belonging to a first angle-of-arrival spread interval into a measurement object group 1; classifies measurement objects, in the plurality of measurement objects, corresponding to an average angle-of-arrival value belonging to a second preset average angle-of-arrival interval and an angle-of-arrival spread value belonging to a second angle-of-arrival spread interval into a measurement object group 2; classifies measurement objects, in the plurality of measurement objects, corresponding to an average angle-of-arrival value belonging to a third preset average angle-of-arrival interval and an angle-of-arrival spread value belonging to a third angle-of-arrival spread interval into a measurement object group 3; and so on. In this way, the plurality of measurement objects are classified into different measurement object groups. Different groups are corresponding to different average angle-of-arrival values and different angle-of-arrival spread values, and measurement objects in a same group are corresponding to a same angle-of-arrival value and a same angle-of-arrival spread value. (C) If the channel characteristic value may be an absolute value, the terminal classifies measurement objects, in the plurality of measurement objects, corresponding to different average angle-of-arrival values and different angle-of-arrival spread values into one group, where different groups are corresponding to different average angle-of-arrival values and different angle-of-arrival spread values, and measurement objects in a same group are corresponding to different average angle-of-arrival values and different angle-of-arrival spread values. (D) If the channel characteristic value may be an interval, the terminal classifies measurement objects, in the plurality of measurement objects, corresponding to average angle-of-arrival values belonging to different average angle-of-arrival intervals and angle-of-arrival spread values belonging to different angle-of-arrival spread intervals into a same measurement object group, where different groups are corresponding to different average angle-of-arrival values and different angle-of-arrival spread values, and measurement objects in a same group are corresponding to different average angle-of-arrival values and different angle-of-arrival spread values. Certainly, the terminal may alternatively classify the plurality of measurement objects into different measurement object groups based on different average angle-of-arrival values and different angle-of-arrival spread values in another manner. This is not limited in this embodiment of this application.

Third Implementable Manner:

When the channel characteristic is an angle of departure, the terminal classifies the plurality of measurement objects into different measurement object groups based on different angle-of-departure values. Optionally, there are the following cases. (A) If the channel characteristic value may be an absolute value, the terminal classifies measurement objects, in the plurality of measurement objects, corresponding to a same angle-of-departure value into one group, where different groups are corresponding to different angle-of-departure values, and measurement objects in a same group are corresponding to a same angle-of-departure value. (B) If the channel characteristic value may be an interval, the terminal classifies measurement objects, in the plurality of measurement objects, corresponding to an angle-of-departure value belonging to a first preset angle-of-departure interval into a measurement object group 1; classifies measurement objects, in the plurality of measurement objects, corresponding to an angle-of-departure value belonging to a second preset angle-of-departure interval into a measurement object group 2; classifies measurement objects, in the plurality of measurement objects, corresponding to an angle-of-departure value belonging to a third preset angle-of-departure interval into a measurement object group 3; and so on. In this way, the plurality of measurement objects are classified into different measurement object groups. Different groups are corresponding to different angle-of-departure values, and measurement objects in a same group are corresponding to a same angle-of-departure value. (C) If the channel characteristic value may be an absolute value, the terminal classifies measurement objects, in the plurality of measurement objects, corresponding to different angle-of-departure values into one group, where different groups are corresponding to different angle-of-departure values, and measurement objects in a same group are corresponding to different angle-of-departure values. (D) If the channel characteristic value may be an interval, the terminal classifies measurement objects, in the plurality of measurement objects, corresponding to angle-of-departure values belonging to different angle-of-departure intervals into a same measurement object group, where different groups are corresponding to different angle-of-departure values, and measurement objects in a same group are corresponding to different angle-of-departure values. Certainly, the terminal may alternatively classify the plurality of measurement objects into different measurement object groups based on different angle-of-departure values in another manner. This is not limited in this embodiment of this application.

Fourth Implementable Manner:

When the channel characteristic includes an average angle of departure and angle-of-departure spread, the terminal classifies the plurality of measurement objects into different measurement object groups based on different average angle-of-departure values and different angle-of-departure spread values. Optionally, there are the following cases. (A) If the channel characteristic value may be an absolute value, the terminal classifies measurement objects, in the plurality of measurement objects, corresponding to a same average angle-of-departure value and a same angle-of-departure spread value into one group, where different groups are corresponding to different average angle-of-departure values and different angle-of-departure spread values, and measurement objects in a same group are corresponding to a same angle-of-departure value and a same angle-of-departure spread value. (B) If the channel characteristic value may be an interval, the terminal classifies measurement objects, in the plurality of measurement objects, corresponding to an average angle-of-departure value belonging to a first preset average angle-of-departure interval and an angle-of-departure spread value belonging to a first angle-of-departure spread interval into a measurement object group 1; classifies measurement objects, in the plurality of measurement objects, corresponding to an average angle-of-departure value belonging to a second preset average angle-of-departure interval and an angle-of-departure spread value belonging to a second angle-of-departure spread interval into a measurement object group 2; classifies measurement objects, in the plurality of measurement objects, corresponding to an average angle-of-departure value belonging to a third preset average angle-of-departure interval and an angle-of-departure spread value belonging to a third angle-of-departure spread interval into a measurement object group 3; and so on. In this way, the plurality of measurement objects are classified into different measurement object groups. Different groups are corresponding to different average angle-of-departure values and different angle-of-departure spread values, and measurement objects in a same group are corresponding to a same angle-of-departure value and a same angle-of-departure spread value. (C) If the channel characteristic value may be an absolute value, the terminal classifies measurement objects, in the plurality of measurement objects, corresponding to different average angle-of-departure values and different angle-of-departure spread values into one group, where different groups are corresponding to different average angle-of-departure values and different angle-of-departure spread values, and measurement objects in a same group are corresponding to different average angle-of-departure values and different angle-of-departure spread values. (D) If the channel characteristic value may be an interval, the terminal classifies measurement objects, in the plurality of measurement objects, corresponding to average angle-of-departure values belonging to different average angle-of-departure intervals and angle-of-departure spread values belonging to different angle-of-departure spread intervals into a same measurement object group, where different groups are corresponding to different average angle-of-departure values and different angle-of-departure spread values, and measurement objects in a same group are corresponding to different average angle-of-departure values and different angle-of-departure spread values. Certainly, the terminal may alternatively classify the plurality of measurement objects into different measurement object groups based on different average angle-of-departure values and different angle-of-departure spread values in another manner. This is not limited in this embodiment of this application.

Fifth Implementable Manner:

When the channel characteristic is QCL information, the terminal classifies the plurality of measurement objects into different measurement object groups based on whether there is a QCL relationship. Optionally, there are the following cases. (A) The terminal classifies measurement objects, in the plurality of measurement objects, having a QCL relationship into one group, where different groups are corresponding to different QCL relationships, and measurement objects in a same group have a QCL relationship. (B) The terminal may classify measurement objects, in the plurality of measurement objects, having no QCL relationship into one group, where different groups are corresponding to different QCL relationships, and measurement objects in a same group have no QCL relationship. Having a QCL relationship means that reference signals corresponding to antenna ports have a same parameter. Alternatively, having a QCL relationship means that a user may determine, based on a parameter of an antenna port, a parameter of an antenna port having a QCL relationship with the antenna port. Alternatively, having a QCL relationship means that two antenna ports have a same parameter. Alternatively, having a QCL relationship means that a difference between parameters of two antenna ports is less than a threshold. The parameter may be at least one of delay spread, Doppler spread, a Doppler frequency shift, an average delay, an average gain, an angle of arrival (AOA), an average AOA, AOA spread, an angle of departure (AOD), an average angle of departure AOD, AOD spread, a receive-antenna spatial correlation parameter, a transmit beam, a receive beam, and a resource identifier. The beam includes at least one of a precode, a weight sequence number, and a beam sequence number. The angles may be decomposition values in different dimensions or a combination of decomposition values in different dimensions. The antenna ports are antenna ports having different antenna port numbers; and/or antenna ports that have a same antenna port number and that are used to send or receive information on different time resources, and/or frequency resources, and/or code domain resources; and/or antenna ports that have different antenna port numbers and that are used to send or receive information on different time resources, and/or frequency resources, and/or code domain resources. The resource identifier includes a channel state information-reference signal (CSI-RS) resource identifier or an SRS resource identifier, and is used to indicate a beam on a resource.

Sixth Implementable Manner:

When the channel characteristic is a transmission delay, the terminal classifies the plurality of measurement objects into different measurement object groups based on different transmission delay values. Optionally, there are the following cases. (A) If the channel characteristic value may be an absolute value, the terminal classifies measurement objects, in the plurality of measurement objects, corresponding to a same transmission delay value into one group, where different groups are corresponding to different transmission delay values, and measurement objects in a same group are corresponding to a same transmission delay value. (B) If the channel characteristic value may be an interval, the terminal classifies measurement objects, in the plurality of measurement objects, corresponding to a transmission delay value belonging to a first preset transmission delay interval into a measurement object group 1; classifies measurement objects, in the plurality of measurement objects, corresponding to a transmission delay value belonging to a second preset transmission delay interval into a measurement object group 2; classifies measurement objects, in the plurality of measurement objects, corresponding to a transmission delay value belonging to a third preset transmission delay interval into a measurement object group 3; and so on. In this way, the plurality of measurement objects are classified into different measurement object groups. Different groups are corresponding to different transmission delay values, and measurement objects in a same group are corresponding to a same transmission delay value. (C) If the channel characteristic value may be an absolute value, the terminal classifies measurement objects, in the plurality of measurement objects, corresponding to different transmission delay values into one group, where different groups are corresponding to different transmission delay values, and measurement objects in a same group are corresponding to different transmission delay values. (D) If the channel characteristic value may be an interval, the terminal classifies measurement objects, in the plurality of measurement objects, corresponding to transmission delay values belonging to different transmission delay intervals into a same measurement object group, where different groups are corresponding to different transmission delay values, and measurement objects in a same group are corresponding to different transmission delay values. Certainly, the terminal may alternatively classify the plurality of measurement objects into different measurement object groups based on different transmission delay values in another manner. This is not limited in this embodiment of this application.

Seventh Implementable Manner:

When the channel characteristic includes an average transmission delay and transmission delay spread, the terminal classifies the plurality of measurement objects into different measurement object groups based on different average transmission delay values and different transmission delay spread values. Optionally, there are the following cases. (A) If the channel characteristic value may be an absolute value, the terminal classifies measurement objects, in the plurality of measurement objects, corresponding to a same average transmission delay value and a same transmission delay spread value into one group, where different groups are corresponding to different average transmission delay values and different transmission delay spread values, and measurement objects in a same group are corresponding to a same average transmission delay value and a same transmission delay spread value. (B) If the channel characteristic value may be an interval, the terminal classifies measurement objects, in the plurality of measurement objects, corresponding to an average transmission delay value belonging to a first preset average transmission delay interval and a transmission delay spread value belonging to a first transmission delay spread interval into a measurement object group 1; classifies measurement objects, in the plurality of measurement objects, corresponding to an average transmission delay value belonging to a second preset average transmission delay interval and a transmission delay spread value belonging to a second transmission delay spread interval into a measurement object group 2; classifies measurement objects, in the plurality of measurement objects, corresponding to an average transmission delay value belonging to a third preset average transmission delay interval and a transmission delay spread value belonging to a third transmission delay spread interval into a measurement object group 3; and so on. In this way, the plurality of measurement objects are classified into different measurement object groups. Different groups are corresponding to different average transmission delay values and different transmission delay spread values, and measurement objects in a same group are corresponding to a same average transmission delay value and a same transmission delay spread value. (C) If the channel characteristic value may be an absolute value, the terminal classifies measurement objects, in the plurality of measurement objects, corresponding to different average transmission delay values and different transmission delay spread values into one group, where different groups are corresponding to different average transmission delay values and different transmission delay spread values, and measurement objects in a same group are corresponding to different average transmission delay values and different transmission delay spread values. (D) If the channel characteristic value may be an interval, the terminal classifies measurement objects, in the plurality of measurement objects, corresponding to average transmission delay values belonging to different average transmission delay intervals and transmission delay spread values belonging to different transmission delay intervals into a same measurement object group, where different groups are corresponding to different average transmission delay values and different transmission delay spread values, and measurement objects in a same group are corresponding to different average transmission delay values and different transmission delay spread values. Certainly, the terminal may alternatively classify the plurality of measurement objects into different measurement object groups based on different average transmission delay values and different transmission delay spread values in another manner. This is not limited in this embodiment of this application.

Eighth Implementable Manner:

When the channel characteristic is channel quality, the terminal classifies the plurality of measurement objects into different measurement object groups based on different channel quality values. Optionally, there are the following cases. (A) If the channel characteristic value may be an absolute value, the terminal classifies measurement objects, in the plurality of measurement objects, corresponding to a same channel quality value into one group, where different groups are corresponding to different channel quality values, and measurement objects in a same group are corresponding to a same channel quality value. (B) If the channel characteristic value may be an interval, the terminal classifies measurement objects, in the plurality of measurement objects, corresponding to a channel quality value belonging to a first preset channel quality interval into a measurement object group 1; classifies measurement objects, in the plurality of measurement objects, corresponding to a channel quality value belonging to a second preset channel quality interval into a measurement object group 2; classifies measurement objects, in the plurality of measurement objects, corresponding to a channel quality value belonging to a third preset channel quality interval into a measurement object group 3; and so on. In this way, the plurality of measurement objects are classified into different measurement object groups. Different groups are corresponding to different channel quality values, and measurement objects in a same group are corresponding to a same channel quality value. (C) If the channel characteristic value may be an absolute value, the terminal classifies measurement objects, in the plurality of measurement objects, corresponding to different channel quality values into one group, where different groups are corresponding to different channel quality values, and measurement objects in a same group are corresponding to different channel quality values. (D) If the channel characteristic value may be an interval, the terminal classifies measurement objects, in the plurality of measurement objects, corresponding to channel quality values belonging to different channel quality intervals into a same measurement object group, where different groups are corresponding to different channel quality values, and measurement objects in a same group are corresponding to different channel quality values. Certainly, the terminal may alternatively classify the plurality of measurement objects into different measurement object groups based on different channel quality values in another manner. This is not limited in this embodiment of this application.

Ninth Implementable Manner:

When the channel characteristic includes a terminal receiving object, the terminal classifies the plurality of measurement objects into different measurement object groups based on different terminal receiving object values (for example, identifiers used to identify terminal receiving objects). Optionally, if the terminal receiving object value may be an absolute value, the terminal classifies measurement objects, in the plurality of measurement objects, corresponding to a same terminal receiving object value into one group, where different groups are corresponding to different terminal receiving object values, and measurement objects in a same group are corresponding to a same terminal receiving object value, or all or some of measurement objects in a same group are corresponding to different terminal receiving object values.

Certainly, the terminal may alternatively classify the plurality of measurement objects into different measurement object groups based on different values of channel characteristics of a same type in another manner. This is not limited in this embodiment of this application.

In this embodiment, after classifying the plurality of measurement objects into the different measurement object groups based on the different values of the channel characteristics of the same type, the terminal sends the group identification information (used to identify a measurement object group to which a measurement object belongs) and the measurement results respectively corresponding to the some or all of the plurality of measurement objects. Optionally, the measurement results corresponding to the some of the measurement objects reported by the terminal satisfy a preset condition. In other words, the terminal does not report measurement objects whose measurement results do not satisfy the preset condition. For example, the terminal reports only measurement objects whose RSRP values are greater than the preset condition, and does not report measurement objects whose RSRP values are less than the preset condition.

In this step, a specific process of the sending, by the terminal, channel characteristic values and measurement results respectively corresponding to some or all of the plurality of measurement objects is implemented in the following manner.

Optionally, after obtaining the measurement results and the channel characteristic values respectively corresponding to the plurality of measurement objects, the terminal sends the channel characteristic values and the measurement results respectively corresponding to the some or all of the plurality of measurement objects to the base station, so that the base station groups the some or all of the plurality of measurement objects based on the channel characteristic values respectively corresponding to the some or all of the plurality of measurement objects. Different groups are corresponding to different channel characteristic values (to be specific, a difference between transmission paths corresponding to measurement objects in different groups is greater than the preset difference); and channel characteristic values corresponding to measurement objects in a same group are the same (that is, transmission paths corresponding to measurement objects in a same group are the same or similar; to be specific, a difference between transmission paths corresponding to measurement objects in a same group is less than or equal to the preset difference), or channel characteristic values corresponding to all or some of measurement objects in a same group are different (that is, transmission paths corresponding to all or some of measurement objects in a same group are different; to be specific, a difference between transmission paths corresponding to all or some of measurement objects in a same group is greater than or equal to the preset difference). Optionally, the channel characteristic value in this application may be an absolute value or an interval.

S205. The base station receives, from the terminal, the group identification information and the measurement results respectively corresponding to the some or all of the plurality of measurement objects, or the channel characteristic values and the measurement results respectively corresponding to the some or all of the plurality of measurement objects.

In this embodiment of this application, when the terminal sends, in step S204, the group identification information and the measurement results respectively corresponding to the some or all of the plurality of measurement objects, the base station correspondingly receives, in step S205 from the terminal, the group identification information and the measurement results respectively corresponding to the some or all of the plurality of measurement objects. Specifically, an implementable manner is as follows.

The base station receives the group identification information and the measurement results that are respectively corresponding to the some or all of the plurality of measurement objects and that are reported by the terminal, and determines a grouping status of measurement objects (that is, determines which measurement objects in the plurality of measurement objects reported by the terminal belong to a group) based on the group identification information, so that the base station determines, from a plurality of measurement object groups, a plurality of target measurement objects used to send data to the terminal. Different groups are corresponding to different channel characteristic values in this embodiment of this application (to be specific, a difference between transmission paths corresponding to measurement objects in different groups is greater than the preset difference), and therefore the plurality of target measurement objects determined by the base station from the plurality of measurement object groups are not easily shielded at the same time. This improves communication reliability. Alternatively, different reported target measurement objects belong to a same group in groups. In this case, the base station selects only one group, and selects beams in the group, so that target measurement objects in the group cannot be easily shielded at the same time.

When the terminal sends, in step S204, the channel characteristic values and the measurement results respectively corresponding to the some or all of the plurality of measurement objects, the base station correspondingly receives, in step S205 from the terminal, the channel characteristic values and the measurement results respectively corresponding to the some or all of the plurality of measurement objects. Specifically, an implementable manner is as follows.

The base station receives the channel characteristic values and the measurement results that are respectively corresponding to the some or all of the plurality of measurement objects and that are sent by the terminal, so that the base station groups the some or all of the plurality of measurement objects based on the channel characteristic values respectively corresponding to the some or all of the plurality of measurement objects, and determines, from a plurality of measurement object groups, a plurality of target measurement objects used to send data to the terminal. Different groups are corresponding to different channel characteristic values in this embodiment of this application (to be specific, a difference between transmission paths corresponding to measurement objects in different groups is greater than the preset difference), and therefore the plurality of target measurement objects determined by the base station from the plurality of measurement object groups are not easily shielded at the same time. This improves communication reliability. Alternatively, during grouping, different target measurement objects belong to a same group. In this case, the base station selects only one group, and selects beams in the group, so that target measurement objects in the group cannot be easily shielded at the same time.

Optionally, the base station groups the some or all of the plurality of measurement objects based on the channel characteristic values respectively corresponding to the some or all of the plurality of measurement objects. For example, the base station classifies the plurality of measurement objects into different measurement object groups based on different values of channel characteristics of a same type. Optionally, for an implementable manner of classifying, by the base station, the plurality of measurement objects into different measurement object groups based on different values of channel characteristics of a same type, reference may be made to the foregoing implementable manner of classifying, by the terminal, the plurality of measurement objects into different measurement object groups based on different values of channel characteristics of a same type. This is not described in this embodiment of this application again.

In this embodiment, after receiving the measurement configuration (which is used to indicate the plurality of measurement objects to be measured) sent by the base station, the terminal obtains the measurement results and the channel characteristic values respectively corresponding to the plurality of measurement objects, and sends the group identification information and the measurement results respectively corresponding to the some or all of the plurality of measurement objects, where different groups are corresponding to different channel characteristic values; and further, the base station receives the group identification information and the measurement results that are respectively corresponding to the some or all of the plurality of measurement objects and that are reported by the terminal, so that the base station determines, from a plurality of measurement object groups after determining a grouping status of measurement objects, a plurality of target measurement objects used to send data to the terminal. Alternatively, the base station receives the channel characteristic values and the measurement results that are respectively corresponding to the some or all of the plurality of measurement objects and that are sent by the terminal, so that the base station groups the some or all of the plurality of measurement objects based on the channel characteristic values respectively corresponding to the some or all of the plurality of measurement objects, and determines, from a plurality of measurement object groups, a plurality of target measurement objects used to send data to the terminal. To sum up, different groups are corresponding to different channel characteristic values in this embodiment of this application (to be specific, a difference between transmission paths corresponding to measurement objects in different groups is greater than the preset difference), and channel characteristic values in a same group may be the same or may be different. If channel characteristic values in a same group are the same, the base station may select a plurality of target measurement objects from different groups; if channel characteristic values in a same group are different, the base station may select, from different groups, one group as target measurement objects. Therefore, the plurality of target measurement objects determined by the base station from the plurality of measurement object groups are not easily shielded at the same time. This improves communication reliability.

Further, based on the embodiment shown in FIG. 2, the base station selects a plurality of target measurement objects from different groups, and channel characteristic values in a same group may be the same or may be different. If channel characteristic values in a same group are the same, the base station may select a plurality of target measurement objects from different groups; if channel characteristic values in a same group are different, the base station may select, from different groups, one group as target measurement objects, and send data to the terminal by using the plurality of target measurement objects. Correspondingly, after step S204, the terminal receives the data that is sent by the base station by using the target measurement objects. The target measurement objects are selected from different groups, or may be selected from one or more groups.

In this embodiment, after determining a grouping status of measurement objects (that is, determining which measurement objects in the plurality of measurement objects reported by the terminal belong to a group), the base station selects a plurality of target measurement objects (optionally, measurement results corresponding to the target measurement objects satisfy the preset condition) from different groups. Optionally, the base station determines, from measurement object groups reported by the terminal, a plurality of measurement object groups as to-be-selected measurement object groups (for example, uses, as the to-be-selected measurement object groups, measurement object groups that include measurement objects corresponding to measurement results exceeding a first preset threshold and that are included in the measurement object groups reported by the terminal), and selects, from each to-be-selected measurement object group, at least one measurement object as a target measurement object. Optionally, the base station sorts, in descending order, measurement results corresponding to all measurement objects in each to-be-selected measurement object group, and uses at least one measurement object that ranks highest in a sorting result, as the target measurement object. Alternatively, if channel characteristics corresponding to measurement objects in a same group are different, the base station selects one group from the plurality of groups, sorts, in descending order, measurement results corresponding to all measurement objects in the to-be-selected measurement object group, and uses at least one measurement object that ranks highest in a sorting result, as the target measurement object. Further, the base station sends data to the terminal by using the plurality of target measurement objects. Optionally, the base station sends the data to the terminal by using the plurality of target measurement objects in one or more of a transmit diversity mode, a fast beam switching mode, and a polling mode, and sends sending mode indication information to the terminal, so that the terminal performs receiving by using a corresponding receiving mode. Optionally, the terminal determines, based on the sending mode indication information, a sending mode used by the base station, and receives, in the corresponding receiving mode, the data sent by the base station by using the plurality of target measurement objects. The plurality of target measurement objects are selected from different groups; or if channel characteristics in a same group are different, the plurality of target measurement objects are selected from one group. Different groups are corresponding to different channel characteristic values (to be specific, a difference between transmission paths or signal strengths corresponding to measurement objects in different groups is greater than the preset difference), or a same group is corresponding to different channel characteristic values (to be specific, a difference between transmission paths or signal strengths corresponding to measurement objects in different groups is greater than the preset difference). Therefore, the plurality of target measurement objects used by the base station are not easily shielded at the same time. This improves communication reliability in one or more of the transmit diversity mode, the fast beam switching mode, and the polling mode.

Further, based on the embodiment shown in FIG. 2, the base station selects a plurality of target measurement objects from one group, and sends data to the terminal by using the plurality of target measurement objects. Correspondingly, after step S204, the terminal receives the data that is sent by the base station by using the target measurement objects. The target measurement objects are selected from one group.

In this embodiment, after determining a grouping status of measurement objects (that is, determining which measurement objects in the plurality of measurement objects reported by the terminal belong to a group), the base station selects a plurality of target measurement objects (optionally, measurement results corresponding to the target measurement objects satisfy the preset condition) from one group. Optionally, the base station determines, from measurement object groups reported by the terminal, one measurement object group as a to-be-selected measurement object group (for example, uses, as the to-be-selected measurement object group, a measurement object group that includes measurement objects corresponding to measurement results exceeding a second preset threshold and that is included in the measurement object groups reported by the terminal), and selects, from the to-be-selected measurement object group, at least one measurement object as a target measurement object. Optionally, the base station sorts, in descending order, measurement results corresponding to all measurement objects in the to-be-selected measurement object group, and uses at least one measurement object that ranks highest in a sorting result, as the target measurement object. Further, the base station sends data to the terminal by using the plurality of target measurement objects. Optionally, the base station sends the data to the terminal by using the plurality of target measurement objects in one or more of a transmit diversity mode, a fast beam switching mode, and a polling mode, and sends sending mode indication information to the terminal, so that the terminal performs receiving by using a corresponding receiving mode. Optionally, the terminal determines, based on the sending mode indication information, a sending mode used by the base station, and receives, in the corresponding receiving mode, the data sent by the base station by using the plurality of target measurement objects. The plurality of target measurement objects are selected from one group. Measurement objects in a same group are corresponding to a same channel characteristic value (that is, transmission paths or signal strengths corresponding to measurement objects in a same group are the same or similar; to be specific, a difference between transmission paths or signal strengths corresponding to measurement objects in a same group is less than or equal to the preset difference). Therefore, when the base station sends the data to the terminal by using the plurality of target measurement objects in the fast beam switching mode or the polling mode, beam switching can be fast implemented. This improves communication reliability.

Optionally, the plurality of measurement objects that are reported by the terminal and that are received by the base station in step S205 may include a measurement object of the base station, and may further include a measurement object of another base station. Correspondingly, the base station determines target measurement objects of the another base station based on the group identification information and the measurement results respectively corresponding to the some or all of the plurality of measurement objects. Further, the base station sends resource indication information to the another base station, where the resource indication information includes identifiers of the target measurement objects of the another base station.

In this embodiment, after determining a grouping status of measurement objects (that is, determining which measurement objects in the plurality of measurement objects of the another base station reported by the terminal belong to a group) based on the group identification information, the base station may select target measurement objects of the another base station from different groups or one group (optionally, measurement results corresponding to the target measurement objects satisfy the preset condition). Optionally, for a manner of the selecting, by the base station, target measurement objects of the another base station from different groups or one group, reference may be made to the foregoing descriptions in this application about "selection of a plurality of target measurement objects from different groups or selection of a plurality of target measurement objects from one group". Details are not described herein again. Further, the base station sends the resource indication information including the identifiers of the target measurement objects of the another base station to the another base station, so that the another base station determines the target measurement objects based on the resource indication information, and the another base station directly uses the target measurement objects to send downlink data to the terminal.

Optionally, based on the foregoing embodiment, before the base station receives, from the terminal, the group identification information and the measurement results respectively corresponding to the some or all of the plurality of measurement objects, or the channel characteristic values and the measurement results respectively corresponding to the some or all of the plurality of measurement objects, the base station sends reporting mode instruction information to the terminal. Correspondingly, before the terminal obtains the measurement results and the channel characteristic values respectively corresponding to the plurality of measurement objects, the terminal receives the reporting mode instruction information sent by the base station.

In this embodiment, before receiving, from the terminal, the group identification information and the measurement results respectively corresponding to the some or all of the plurality of measurement objects, or the channel characteristic values and the measurement results respectively corresponding to the some or all of the plurality of measurement objects, when finding that current channel quality is unstable or there are a relatively large quantity of shields, the base station sends the reporting mode instruction information to the terminal. The reporting mode instruction information is used to instruct the terminal to report the channel characteristic values and the measurement results respectively corresponding to the some or all of the plurality of measurement objects; or used to instruct the terminal to report the group identification information and the measurement results respectively corresponding to the some or all of the plurality of measurement objects, where the some or all of the plurality of measurement objects belong to a same group; or used to instruct the terminal to report the group identification information and the measurement results respectively corresponding to the some or all of the plurality of measurement objects, where the some or all of the plurality of measurement objects belong to different groups. Correspondingly, the terminal receives the reporting mode instruction information sent by the base station, and reports related information to the base station according to the reporting mode instruction information. Optionally, if the reporting mode instruction information is used to instruct the terminal to report the group identification information and the measurement results respectively corresponding to the some or all of the plurality of measurement objects, where the some or all of the plurality of measurement objects belong to a same group, the terminal reports measurement results corresponding to measurement objects in one measurement object group to the base station, so that the base station selects a plurality of target measurement objects from the measurement object group. For example, the terminal reports, to the base station, a measurement object group corresponding to a best measurement result among a plurality of measurement object groups that are obtained through grouping. If the reporting mode instruction information is used to instruct the terminal to report the group identification information and the measurement results respectively corresponding to the some or all of the plurality of measurement objects, where the some or all of the plurality of measurement objects belong to different groups, the terminal reports measurement results corresponding to measurement objects in a plurality of measurement object groups to the base station, so that the base station selects a plurality of target measurement objects from the plurality of measurement object groups. For example, the terminal sorts, based on the measurement results and in descending order, the plurality of measurement object groups obtained through grouping, and then reports, to the base station, at least two measurement object groups that ranks highest. Optionally, the reporting mode instruction information may be further used to instruct the terminal to perform periodic or aperiodic reporting. (a) In terms of periodic reporting, the reporting mode instruction information may be further used to indicate reporting periods corresponding to measurement object groups (reporting periods of different groups may be the same or may be different). (b) In terms of aperiodic reporting, the reporting mode instruction information may be further used to indicate reporting time corresponding to measurement object groups (reporting time of different groups may be the same or may be different).

Optionally, the reporting mode instruction information may be carried in Radio Resource Control (RRC) signaling or downlink control information (DCI). Certainly, the reporting mode instruction information may be carried in other information. This is not limited in this embodiment of this application.

Further, based on the foregoing embodiment, for a communications system in which reciprocity exists between an uplink and a downlink, the terminal uses, as a sending measurement object (used by the terminal to send data to the base station), a receiving object that is utilized when the data sent by the base station by using the target measurement objects is being received, so that the terminal directly sends the data to the base station by using the sending measurement object, and the base station does not need to indicate a sending measurement object to be used by the terminal to send the data to the base station.

Figure 3:
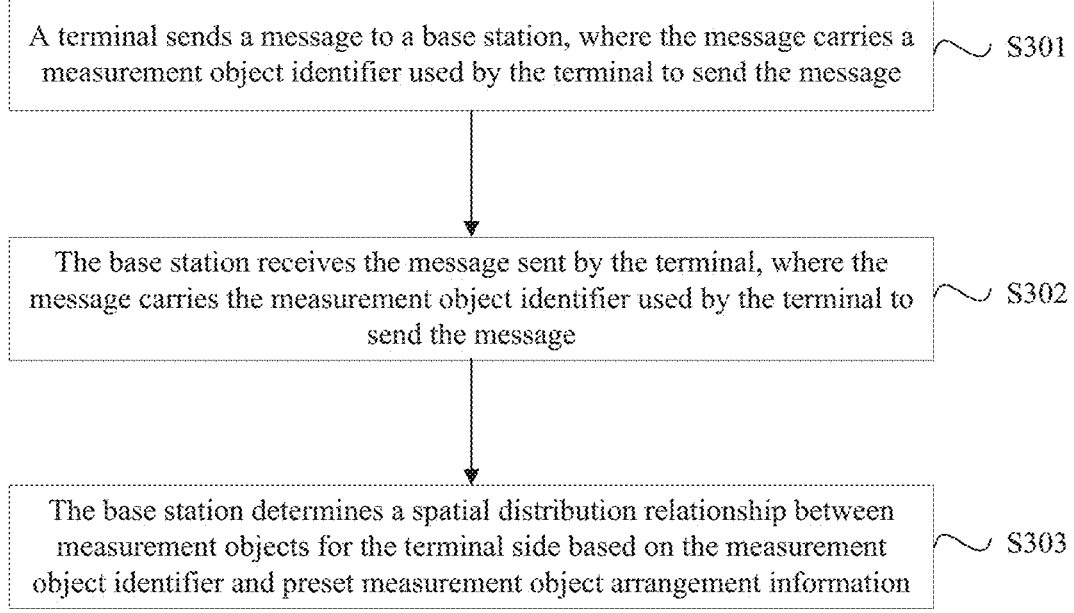
FIG. 3 is a schematic flowchart of another measurement and reporting method according to an embodiment of this application.

FIG. 3 is a schematic flowchart of another measurement and reporting method according to an embodiment of this application. As shown in FIG. 3, for a communications system in which no reciprocity exists between an uplink and a downlink, the method in this embodiment may include the following steps.

S301. A terminal sends a message to a base station, where the message carries a measurement object identifier used by the terminal to send the message.

Usually, a measurement object used by the terminal to send uplink data to the base station needs to be allocated by the base station. In this step, the terminal sends the message to the base station, where the message carries the measurement object identifier (for example, a measurement object 1) used by the terminal to send the message.

S302. The base station receives the message sent by the terminal, where the message carries the measurement object identifier used by the terminal to send the message.

S303. The base station determines a spatial distribution relationship between measurement objects for the terminal side based on the measurement object identifier and preset measurement object arrangement information.

In this step, optionally, the base station may learn of the preset measurement object arrangement information in advance. The preset measurement object arrangement information includes preset spatial arrangement information (that is, a spatial arrangement rule) and measurement object identifiers (that is, measurement object identifiers corresponding to the spatial arrangement rule; optionally, naming rules of measurement object identifiers corresponding to different spatial arrangement rules are different) that are corresponding to a combination of measurement objects. For example, it is assumed that a preset spatial arrangement rule 1 is: Three measurement objects of the terminal are spatially arranged clockwise with the terminal as a center. A clockwise angle between a measurement object 1 and a measurement object 2 is 60 degrees, a clockwise angle between the measurement object 2 and a measurement object 3 is 120 degrees, and a clockwise angle between the measurement object 3 and the measurement object 2 is 180 degrees. In this case, based on a measurement object identifier (for example, the measurement object 1) and preset measurement object arrangement information (including a plurality of preset spatial arrangement rules), the base station determines that the measurement object identifier (for example, the measurement object 1) belongs to the preset spatial arrangement rule 1, and determines a spatial distribution relationship between measurement objects for the terminal side based on the preset spatial arrangement rule 1, for example, determines that the measurement objects for the terminal are arranged according to the preset spatial arrangement rule 1. In this way, when subsequently allocating, to the terminal, measurement objects used by the terminal to send uplink data to the base station, the base station selects, as far as possible, a plurality of measurement objects that are far away from each other in terms of spatial arrangement, and therefore the plurality of measurement objects are not easily shielded at the same time. This improves communication reliability. Optionally, the foregoing provides descriptions by using the preset spatial arrangement rule 1 as an example in this embodiment. Certainly, the preset measurement object arrangement information may alternatively include a plurality of other preset spatial arrangement rules. Manners in which the base station determines measurement objects for the terminal according to other preset spatial arrangement rules are similar to the manner in which the base station determines measurement objects for the terminal according to the preset spatial arrangement rule 1. Details are not described herein again.

In this embodiment of this application, after receiving the message sent by the terminal (the message carries the measurement object identifier used by the terminal to send the message), the base station determines the spatial distribution relationship between the measurement objects for the terminal side based on the measurement object identifier and the preset measurement object arrangement information. In this way, when subsequently allocating, to the terminal, measurement objects used by the terminal to send uplink data to the base station, the base station selects, as far as possible, a plurality of measurement objects that are far away from each other in terms of spatial arrangement, and therefore the plurality of measurement objects are not easily shielded at the same time. This improves communication reliability.

Figure 4:
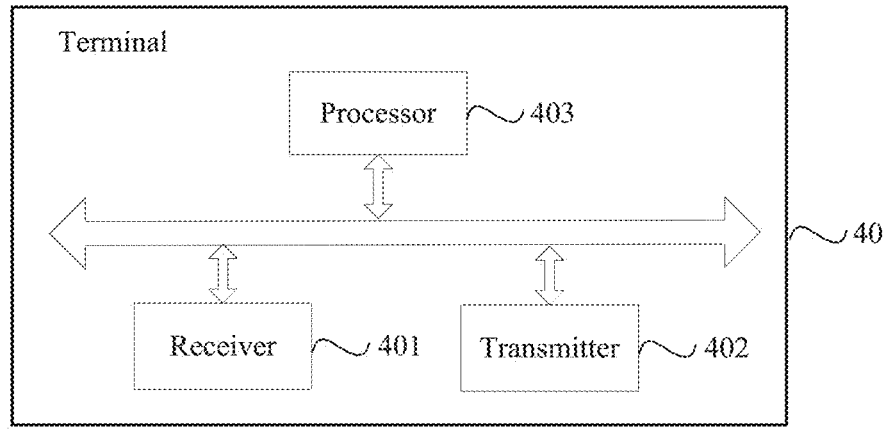
FIG. 4 is a schematic structural diagram of a terminal according to an embodiment of the present invention.

FIG. 4 is a schematic structural diagram of a terminal according to an embodiment of the present invention. As shown in FIG. 4, the terminal 40 provided in this embodiment may include a receiver 401, a transmitter 402, and a processor 403.

The receiver 401 is configured to receive a measurement configuration from a base station, where the measurement configuration is used to indicate a plurality of measurement objects to be measured;

the processor 403 is configured to obtain measurement results and channel characteristic values respectively corresponding to the plurality of measurement objects; and the transmitter 402 is configured to send channel characteristic values and measurement results respectively corresponding to some or all of the plurality of measurement objects, or group identification information and measurement results respectively corresponding to some or all of the plurality of measurement objects, where different groups are corresponding to different channel characteristic values.

Optionally, a channel characteristic includes one or more of the following:

an angle of arrival, an average angle of arrival, angle-of-arrival spread, an angle of departure, an average angle of departure, angle-of-departure spread, QCL information, a transmission delay, an average transmission delay, transmission delay spread, channel quality, and a terminal receiving object.

Optionally, the receiver 401 is further configured to receive reporting mode instruction information from the base station, where the reporting mode instruction information is used to:

instruct the terminal to report the channel characteristic values and the measurement results respectively corresponding to the some or all of the plurality of measurement objects; or instruct the terminal to report the group identification information and the measurement results respectively corresponding to the some or all of the plurality of measurement objects, where the some or all of the plurality of measurement objects belong to a same group; or instruct the terminal to report the group identification information and the measurement results respectively corresponding to the some or all of the plurality of measurement objects, where the some or all of the plurality of measurement objects belong to different groups.

Optionally, the channel characteristic is an angle of arrival, and that different groups are corresponding to different channel characteristic values includes: different groups are corresponding to different angle-of-arrival values.

Optionally, the channel characteristic is an average angle of arrival and angle-of-arrival spread, and that different groups are corresponding to different channel characteristic values includes: different groups are corresponding to different average angle-of-arrival values and different angle-of-arrival spread values.

Optionally, the channel characteristic is an angle of departure, and that different groups are corresponding to different channel characteristic values includes: different groups are corresponding to different angle-of-departure values. Angle-of-departure values in a same group may be the same or may be different.

Optionally, the channel characteristic is an average angle of departure and angle-of-departure spread, and that different groups are corresponding to different channel characteristic values includes: different groups are corresponding to different average angle-of-departure values and different angle-of-departure spread values. Average angle-of-departure values and angle-of-departure spread values in a same group may be the same or may be different.

Optionally, the channel characteristic is QCL information, and that different groups are corresponding to different QCL information includes: different groups are corresponding to different average angle-of-departure values and different angle-of-departure spread values. QCL information in a same group may be the same or may be different.

Optionally, the channel characteristic is a transmission delay, and that different groups are corresponding to different channel characteristic values includes: different groups are corresponding to different transmission delay values. Transmission delay values in a same group may be the same or may be different.

Optionally, the channel characteristic is an average transmission delay and transmission delay spread, and that different groups are corresponding to different channel characteristic values includes: different groups are corresponding to different average transmission delay values and different transmission delay spread values. Average transmission delay values and transmission delay spread values in a same group may be the same or may be different.

Optionally, the channel characteristic is channel quality, and that different groups are corresponding to different channel characteristic values includes: different groups are corresponding to different channel quality values. Channel quality values in a same group may be the same or may be different.

Optionally, the channel characteristic is a terminal receiving object, and that different groups are corresponding to different channel characteristic values includes: different groups are corresponding to different terminal receiving object values. Terminal receiving object values in a same group may be the same or may be different.

Optionally, the measurement results corresponding to the some of the measurement objects satisfy a preset condition.

Optionally, the receiver 401 is further configured to receive data that is sent by the base station by using target measurement objects, where the target measurement objects are selected from different groups.

Optionally, the receiver 401 is further configured to receive data that is sent by the base station by using target measurement objects, where the target measurement objects are selected from one group.

Optionally, the processor 403 is further configured to use, as a sending measurement object, a receiving object that is utilized when the data sent by the base station by using the target measurement objects is being received, where the sending measurement object is used by the terminal to send data to the base station.

The terminal in this embodiment of this application can be configured to execute the technical solution of any embodiment of the measurement and reporting method in the present invention, and implementation principles and technical effects thereof are similar to those in the measurement and reporting method. Details are not described herein again.

Figure 5:
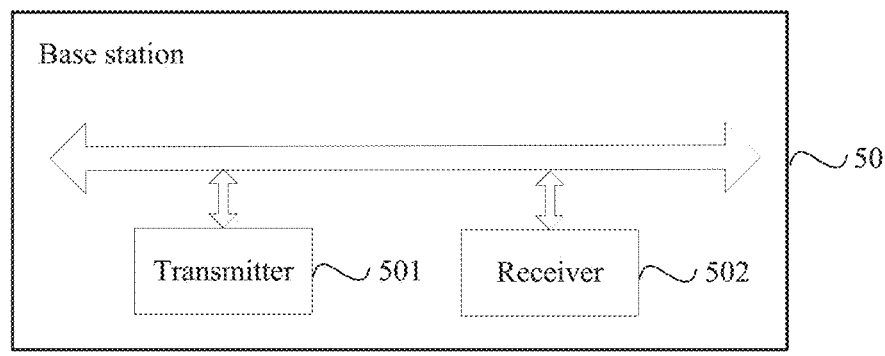
FIG. 5 is a schematic structural diagram of a base station according to an embodiment of the present invention.

FIG. 5 is a schematic structural diagram of a base station according to an embodiment of the present invention. As shown in FIG. 5, the base station 50 provided in this embodiment may include a transmitter 501 and a receiver 502.

The transmitter 501 is configured to send a measurement configuration to a terminal, where the measurement configuration is used to indicate a plurality of measurement objects to be measured; and the receiver 502 is configured to receive, from the terminal, group identification information and measurement results respectively corresponding to some or all of the plurality of measurement objects, or channel characteristic values and measurement results respectively corresponding to some or all of the plurality of measurement objects, where different groups are corresponding to different channel characteristic values.

Optionally, a channel characteristic includes one or more of the following:

an angle of arrival, an average angle of arrival, angle-of-arrival spread, an angle of departure, an average angle of departure, angle-of-departure spread, QCL information, a transmission delay, an average transmission delay, transmission delay spread, channel quality, and a terminal receiving object.

Optionally, the transmitter 501 is further configured to send reporting mode instruction information to the terminal, where the reporting mode instruction information is used to:

instruct the terminal to report the channel characteristic values and the measurement results respectively corresponding to the some or all of the plurality of measurement objects; or instruct the terminal to report the group identification information and the measurement results respectively corresponding to the some or all of the plurality of measurement objects, where the some or all of the plurality of measurement objects belong to a same group; or instruct the terminal to report the group identification information and the measurement results respectively corresponding to the some or all of the plurality of measurement objects, where the some or all of the plurality of measurement objects belong to different groups.

Optionally, the base station further includes a first processor, where the first processor is configured to group the some or all of the plurality of measurement objects based on the channel characteristic values respectively corresponding to the some or all of the plurality of measurement objects.

Optionally, the channel characteristic is an angle of arrival, and that different groups are corresponding to different channel characteristic values includes: different groups are corresponding to different angle-of-arrival values. Angle-of-arrival values in a same group may be the same or may be different.

Optionally, the channel characteristic is an average angle of arrival and angle-of-arrival spread, and that different groups are corresponding to different channel characteristic values includes: different groups are corresponding to different average angle-of-arrival values and different angle-of-arrival spread values. Average angle-of-arrival values and angle-of-arrival spread values in a same group may be the same or may be different.

Optionally, the channel characteristic is an angle of departure, and that different groups are corresponding to different channel characteristic values includes: different groups are corresponding to different angle-of-departure values. Angle-of-departure values in a same group may be the same or may be different.

Optionally, the channel characteristic is an average angle of departure and angle-of-departure spread, and that different groups are corresponding to different channel characteristic values includes: different groups are corresponding to different average angle-of-departure values and different angle-of-departure spread values. Average angle-of-departure values and angle-of-departure spread values in a same group may be the same or may be different.

Optionally, the channel characteristic is QCL information, and that different groups are corresponding to different QCL information includes: different groups are corresponding to different average angle-of-departure values and different angle-of-departure spread values. QCL information in a same group may be the same or may be different.

Optionally, the channel characteristic is a transmission delay, and that different groups are corresponding to different channel characteristic values includes: different groups are corresponding to different transmission delay values. Transmission delay values in a same group may be the same or may be different.

Optionally, the channel characteristic is an average transmission delay and transmission delay spread, and that different groups are corresponding to different channel characteristic values includes: different groups are corresponding to different average transmission delay values and different transmission delay spread values. Average transmission delay values and transmission delay spread values in a same group may be the same or may be different.

Optionally, the channel characteristic is channel quality, and that different groups are corresponding to different channel characteristic values includes: different groups are corresponding to different channel quality values. Channel quality values in a same group may be the same or may be different.

Optionally, the channel characteristic is a terminal receiving object, and that different groups are corresponding to different channel characteristic values includes: different groups are corresponding to different terminal receiving object values. Terminal receiving object values in a same group may be the same or may be different.

Optionally, the transmitter 501 is further configured to:
select a plurality of target measurement objects from different groups; and send data to the terminal by using the plurality of target measurement objects.

Optionally, the transmitter 501 is further configured to:
select a plurality of target measurement objects from one group; and send data to the terminal by using the plurality of target measurement objects.

Optionally, measurement results corresponding to the target measurement objects satisfy a preset condition.

Optionally, the base station further includes a second processor, where the second processor is configured to determine target measurement objects of another base station based on the group identification information and the measurement results respectively corresponding to the some or all of the plurality of measurement objects; and the transmitter 501 is further configured to send resource indication information to the another base station, where the resource indication information includes identifiers of the target measurement objects of the another base station.

The first processor and the second processor in this embodiment may be a same processor or different processors. The base station in this embodiment of this application can be configured to execute the technical solution of any embodiment of the measurement and reporting method in the present invention, and implementation principles and technical effects thereof are similar to those in the measurement and reporting method. Details are not described herein again.

Functions of the transmitter and the receiver in this application may be implemented by a transceiver.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements, to achieve the objectives of the solutions of the embodiments.

In addition, functional units in the embodiments of this application may be integrated into one processing unit, or each of the units may exist alone physically, or at least two units may be integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor to perform some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

It may be clearly understood by persons skilled in the art that, for ease and brevity of description, division of the foregoing functional modules is used as an example for illustration. In actual application, the foregoing functions may be allocated to different functional modules for implementation, depending on a requirement. To be specific, an inner structure of an apparatus is divided into different functional modules to implement all or some of the functions described above. For a detailed working process of the foregoing apparatus, reference may be made to a corresponding process in the foregoing method embodiments. Details are not described herein again.

Persons of ordinary skill may understand that various numbers such as "first" and "second" in this specification are merely used for differentiation for ease of description, but are not used to limit the scope of the embodiments of this application.

Persons of ordinary skill in the art may understand that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes various media that can store program code, such as a ROM, a RAM, a magnetic disk, or an optical disc.

Finally, it should be noted that the foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A measurement and reporting method, comprising:
   receiving, by a terminal, a measurement configuration from a base station, wherein the measurement configuration is used to indicate a plurality of measurement objects to be measured;
   obtaining, by the terminal, measurement results and channel characteristic values respectively corresponding to the plurality of measurement objects;
   grouping, by the terminal, the plurality of measurement objects into a plurality of measurement groups based on different values of channel characteristics of a same type to develop group identification information identifying groups of measurement objects, wherein different measurement groups correspond to different channel characteristic values, and wherein the channel characteristic value is an absolute value or an interval;
   sending, by the terminal, the group identification information and the measurement results respectively corresponding to some or all of the plurality of measurement objects to the base station, wherein the groups correspond to different channel characteristic values;
   when channel characteristic values corresponding to measurement objects in a same group are the same, receiving, by the terminal, data from the base station by using a plurality of target measurement objects, wherein the plurality of target measurement objects are from different groups; and
   when channel characteristic values corresponding to all or some measurement objects in a same group are different, receiving, by the terminal, data from the base station by using the plurality of target measurement objects, wherein the plurality of target measurement objects are from one group.

2. The method according to claim 1, wherein a channel characteristic comprises one or more of:
   an angle of arrival, an average angle of arrival, angle-of-arrival spread, an angle of departure, an average angle of departure, angle-of-departure spread, quasi co-location QCL information, a transmission delay, an average transmission delay, transmission delay spread, channel quality, and a terminal receiving object.

3. The method according to claim 1, wherein the measurement results corresponding to some measurement objects satisfy a preset condition.

4. The method according to claim 1, further comprising:
   using, as a sending measurement object, a receiving object that is utilized when the data sent by the base station by using the plurality of target measurement objects is being received, wherein the sending measurement object is used to send data to the base station.

5. An apparatus, comprising a receiver, a transmitter, and a processor, wherein:
   the receiver is configured to receive a measurement configuration from a base station, wherein the measurement configuration is used to indicate a plurality of measurement objects to be measured;
   the processor is configured to:
   obtain measurement results and channel characteristic values respectively corresponding to the plurality of measurement objects; and
   group the plurality of measurement objects into a plurality of measurement groups based on different values of channel characteristics of a same type to develop group identification information identifying groups of measurement objects, wherein different measurement groups correspond to different channel characteristic values, and wherein the channel characteristic value is an absolute value or an interval;
   the transmitter is configured to send the group identification information and measurement results respectively corresponding to some or all of the plurality of measurement objects, wherein the groups correspond to different channel characteristic values, and the receiver is further configured to:

when channel characteristic values corresponding to measurement objects in a same group are the same, receive data from the base station by using a plurality of target measurement objects, wherein the plurality of target measurement objects are from different groups; and when channel characteristic values corresponding to all or some measurement objects in a same group are different, receive data from the base station by using the plurality of target measurement objects, wherein the plurality of target measurement objects are from one group.

6. The apparatus according to claim 5, wherein a channel characteristic comprises one or more of:

an angle of arrival, an average angle of arrival, angle-of-arrival spread, an angle of departure, an average angle of departure, angle-of-departure spread, QCL information, a transmission delay, an average transmission delay, transmission delay spread, channel quality, and a terminal receiving object.

7. The apparatus according to claim 5, wherein the receiver is further configured to receive reporting mode instruction information from the base station, wherein the reporting mode instruction information is used to:

instruct to report the group identification information and the measurement results respectively corresponding to the some or all of the plurality of measurement objects, wherein the some or all of the plurality of measurement objects belong to a same group; or instruct to report the group identification information and the measurement results respectively corresponding to the some or all of the plurality of measurement objects, wherein the some or all of the plurality of measurement objects belong to different groups.

8. The apparatus according to claim 6, wherein the channel characteristic and different groups corresponding to different channel characteristic values comprise one or more of:

the channel characteristic is an angle of arrival, and the groups correspond to different channel characteristic values comprises: different groups are corresponding to different angle-of-arrival values, or the channel characteristic is an average angle of arrival and angle-of-arrival spread, and the groups correspond to different channel characteristic values comprises: different groups are corresponding to different average angle-of-arrival values and different angle-of-arrival spread values, or the channel characteristic is an angle of departure, and the groups correspond to different channel characteristic values comprises: different groups are corresponding to different angle-of-departure values, or the channel characteristic is an average angle of departure and angle-of-departure spread, and the groups correspond to different channel characteristic values comprises: different groups are corresponding to different average angle-of-departure values and different angle-of-departure spread values, or the channel characteristic is a QCL characteristic, and the groups correspond to different QCL characteristic values comprises: different groups are corresponding to different QCL parameter values, or the channel characteristic is a transmission delay, and the groups correspond to different channel characteristic values comprises: different groups are corresponding to different transmission delay values, or the channel characteristic is an average transmission delay and transmission delay spread, and the groups correspond to different channel characteristic values comprises: different groups are corresponding to different average transmission delay values and different transmission delay spread values, or the channel characteristic is channel quality, the groups correspond to different channel characteristic values comprises: different groups are corresponding to different channel quality values, or the channel characteristic is a terminal receiving object, and the groups correspond to different channel characteristic values comprises: different groups are corresponding to different terminal receiving object values.

9. The apparatus according to claim 5, wherein a subset of the measurement results satisfy a preset condition.

10. The apparatus according to claim 5, wherein the processor is further configured to use, as a sending measurement object, a receiving object that is utilized when the data sent by the base station by using the plurality of target measurement objects is being received, wherein the sending measurement object is used to send data to the base station.

11. An apparatus, comprising a processor, a transmitter and a receiver, wherein:

the transmitter is configured to send a measurement configuration to a terminal, wherein the measurement configuration is used to indicate a plurality of measurement objects to be measured;

the receiver is configured to receive, from the terminal, group identification information and measurement results respectively corresponding to some or all of the plurality of measurement objects, wherein the group identification information and measurement results group the plurality of measurement objects based on different values of channel characteristics of a same type, wherein different measurement groups correspond to different channel characteristic values, and wherein the channel characteristic value is an absolute value or an interval;

the processor is configured to select a plurality of target measurement objects from different groups or from one group based on whether channel characteristic values corresponding to measurement objects in a same group are the same or different; and the transmitter is further configured to:

send data to the terminal by using the plurality of target measurement objects from the different groups when the channel characteristic values are the same; and send data to the terminal by using the plurality of target measurement objects from the one group when the channel characteristic values are different.

12. The apparatus according to claim 11, wherein a channel characteristic comprises one or more of:

an angle of arrival, an average angle of arrival, angle-of-arrival spread, an angle of departure, an average angle of departure, angle-of-departure spread, QCL information, a transmission delay, an average transmission delay, transmission delay spread, channel quality, and a terminal receiving object.

13. The apparatus according to claim 11, wherein the transmitter is further configured to send reporting mode instruction information to the terminal, wherein the reporting mode instruction information is used to:

instruct the terminal to report the group identification information and the measurement results respectively corresponding to the some or all of the plurality of measurement objects, wherein the some or all of the plurality of measurement objects belong to a same group; or instruct the terminal to report the group identification information and the measurement results respectively corresponding to the some or all of the plurality of measurement objects, wherein the some or all of the plurality of measurement objects belong to different groups.

14. The apparatus according to claim 11, further comprising a second processor, wherein:

the second processor is configured to determine target measurement objects of another base station other than a base station the apparatus is or is used for based on the group identification information and the measurement results respectively corresponding to the some or all of the plurality of measurement objects; and the transmitter is further configured to send resource indication information to the another base station, wherein the resource indication information comprises identifiers of the target measurement objects of the another base station.

15. A system, comprising a base station and a terminal, wherein the base station is configured to:

send a measurement configuration to the terminal, wherein the measurement configuration is used to indicate a plurality of measurement objects to be measured; and receive, from the terminal, group identification information and measurement results respectively corresponding to some or all of the plurality of measurement objects, wherein the group identification information and measurement results group the plurality of measurement objects based on different values of channel characteristics of a same type, wherein different measurement groups correspond to different channel characteristic values, and wherein the channel characteristic value is an absolute value or an interval;

select a plurality of target measurement objects from different groups or from one group based on whether channel characteristic values corresponding to measurement objects in a same group are the same or different;

send data to the terminal by using the plurality of target measurement objects from the different groups when the channel characteristic values are the same; and send data to the terminal by using the plurality of target measurement objects from the one group when the channel characteristic values are different.

* * * * *